(12) United States Patent
Toratani et al.

(10) Patent No.: US 11,450,248 B2
(45) Date of Patent: Sep. 20, 2022

(54) IMAGE DISPLAY DEVICE AND IMAGE DISPLAY METHOD

(71) Applicant: Sony Group Corporation, Tokyo (JP)

(72) Inventors: Eiji Toratani, Tokyo (JP); Masahiro Tenpaku, Tokyo (JP)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/292,608

(22) PCT Filed: Sep. 20, 2019

(86) PCT No.: PCT/JP2019/037021
§ 371 (c)(1),
(2) Date: May 10, 2021

(87) PCT Pub. No.: WO2020/105271
PCT Pub. Date: May 28, 2020

(65) Prior Publication Data
US 2022/0005391 A1 Jan. 6, 2022

(30) Foreign Application Priority Data
Nov. 20, 2018 (JP) .............................. JP2018-217321

(51) Int. Cl.
*G09G 3/00* (2006.01)
(52) U.S. Cl.
CPC ....... *G09G 3/002* (2013.01); *G09G 2320/048* (2013.01); *G09G 2320/06* (2013.01); *G09G 2354/00* (2013.01)
(58) Field of Classification Search
None
See application file for complete search history.

(56) References Cited

U.S. PATENT DOCUMENTS 5,829,855 A 11/1998 Uchiyama
6,456,016 B1* 9/2002 Sundahl ............... G09G 3/3208
315/291
(Continued)

FOREIGN PATENT DOCUMENTS

JP 9-230498 A 9/1997
JP 2009-42342 A 2/2009
(Continued)

OTHER PUBLICATIONS

International Search Report dated Dec. 10, 2019 in PCT/JP2019/037021 filed Sep. 20, 2019, 2 pages.

*Primary Examiner* — Matthew Yeung
(74) *Attorney, Agent, or Firm* — Oblon, McClelland, Maier & Neustadt, L.L.P.

(57) ABSTRACT

An image display device includes a use aspect information acquisition unit that acquires use aspect information regarding an equipment use aspect, an early period mode setting unit that sets a parameter related to processing or operation executed at a time of image display on the basis of the acquired use aspect information and causes image display operation to be executed as an early period mode, a later period mode setting unit that, in response to determination that it is the mode change timing, resets a parameter related to processing or operation executed at a time of image display and causes image display operation to be executed as a later period mode, and a timing determination unit that determines the mode change timing.

10 Claims, 14 Drawing Sheets

(56) References Cited

U.S. PATENT DOCUMENTS

| | | | |
|---|---|---|---|
| 2008/0224966 A1* | 9/2008 | Cok | G09G 3/32 |
| | | | 345/82 |
| 2008/0246702 A1* | 10/2008 | Lee | G09G 3/3233 |
| | | | 345/77 |
| 2013/0141351 A1* | 6/2013 | Aisaka | G09G 5/10 |
| | | | 345/173 |
| 2016/0054788 A1* | 2/2016 | Gulati | G06F 1/3209 |
| | | | 713/340 |

FOREIGN PATENT DOCUMENTS

| | | |
|---|---|---|
| JP | 2012-242598 A | 12/2012 |
| JP | 2016-2119 A | 1/2016 |
| WO | WO 2009/050780 A1 | 4/2009 |
| WO | WO 2016/002119 A1 | 1/2016 |

* cited by examiner

FIG. 5
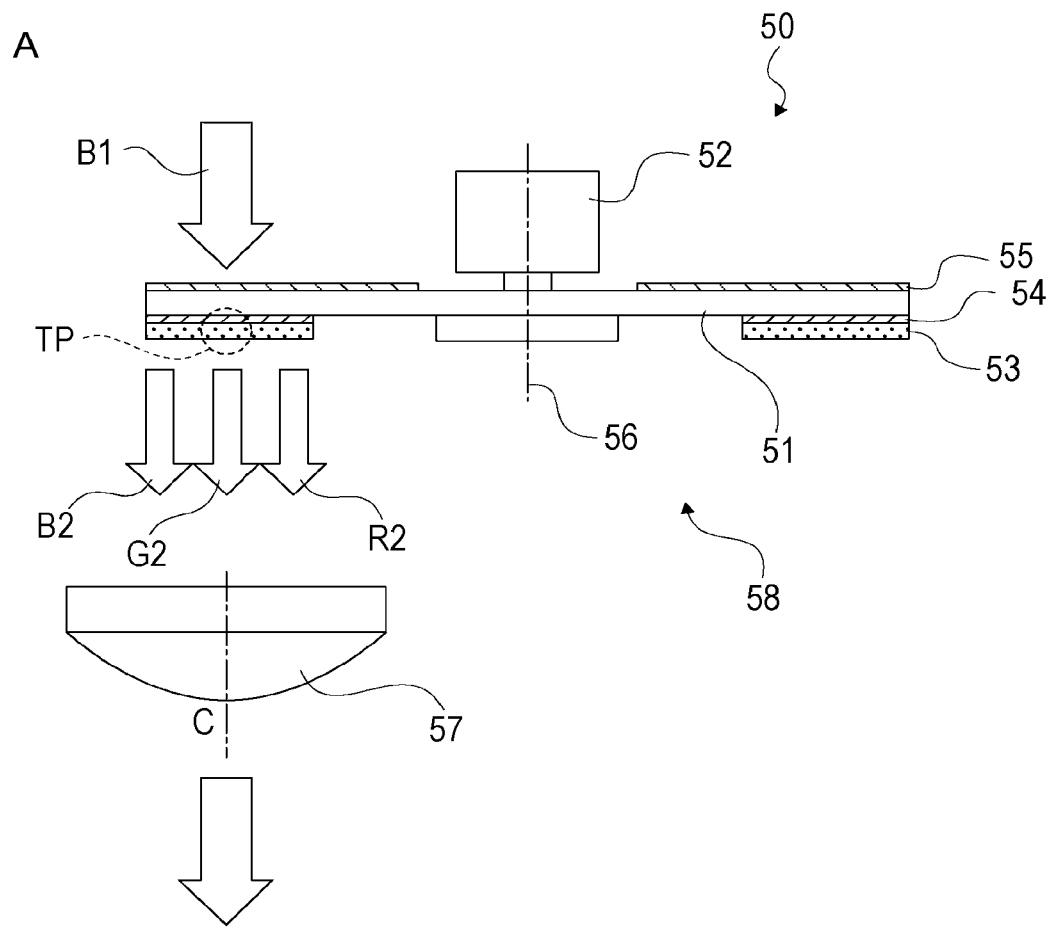
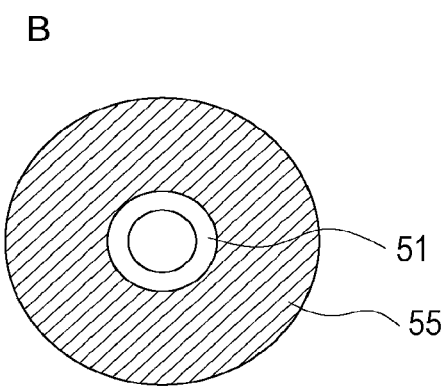
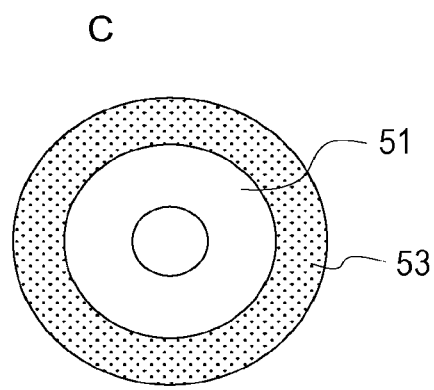

FIG. 8

| PARAMETER SET PS | LUMINESCENCE DRIVE CURRENT | LUMINANCE ADJUSTMENT | SATURATION ADJUSTMENT | FAN ROTATIONAL RATE | PHOSPHOR WHEEL ROTATIONAL RATE | ... |
|---|---|---|---|---|---|---|
| PS1 | ... | ... | ... | ... | ... | ... |
| PS2 | ... | ... | ... | ... | ... | ... |
| PS3 | ... | ... | ... | ... | ... | ... |
| PS4 | ... | ... | ... | ... | ... | ... |
| ⋮ | ⋮ | ⋮ | ⋮ | ⋮ | ⋮ | ⋮ |

FIG. 9

| | PARAMETER SET |
|---|---|
| FOR EARLY PERIOD MODE (FOR USE ASPECT ADAPTIVE MODE) | PS1, PS2 ··· PS10 |
| FOR LATER PERIOD MODE (FOR EQUIPMENT LIFETIME PRIORITIZING MODE) | PS11, PS12 ··· PS20 |

FIG. 15

|  | PARAMETER SET |
|---|---|
| FOR EARLY PERIOD MODE | PS1, PS2 · · · PS10 |
| FOR LATER-PERIOD FIRST MODE | PS11, PS12 · · · PS20 |
| FOR LATER-PERIOD SECOND MODE | PS21, PS22 · · · PS30 |

IMAGE DISPLAY DEVICE AND IMAGE DISPLAY METHOD

TECHNICAL FIELD

The present technology relates to an image display device and an image display method, in particular to technology for controlling an operation mode at a time of image display.

BACKGROUND ART

In a field of image display devices such as projectors, various kinds of parameters are prepared for operation of image display, and various kinds of adjustments such as image quality, luminance, saturation, or contrast can be performed in response to mode operation by a user.

Patent Document 1 below discloses that a mode setting related to display power is performed.

CITATION LIST

Patent Document

Patent Document 1: Japanese Unexamined Patent Application No. 2016-002119

SUMMARY OF THE INVENTION

Problems to be Solved by the Invention

By the way, in general, various kinds of parameters related to image quality, brightness, or the like, are adjusted on a short-time basis according to user operation or a detection status of a sensor, or the like, in an image display device, such as a projector.

However, there is nothing that automatically performs appropriate adjustment when taking into consideration a long time span expected as equipment lifetime, for example.

Therefore, the present technology proposes a technical idea with which an operation mode related to image display can be switched in stages in a period expected as equipment lifetime in consideration of temporal circumstances.

Solutions to Problems

An image display device according to the present technology includes a use aspect information acquisition unit that acquires use aspect information regarding an equipment use aspect, an early period mode setting unit that sets a parameter related to processing or operation executed at a time of image display on the basis of the use aspect information acquired by the use aspect information acquisition unit and causes image display operation to be executed as an early period mode, a later period mode setting unit that, in response to determination that it is the mode change timing, resets a parameter related to processing or operation executed at a time of image display and causes image display operation to be executed as a later period mode, and a timing determination unit that determines the mode change timing.

For example, a period during which an image display device as a projector, or the like, continues to be used (a period corresponding to equipment lifetime) is roughly divided into an early period and a later period, and a basic mode is ensured to be changed between the early period and the later period. Here, the parameter related to processing or operation executed at a time of image display is expected to be, for example, a current value of a luminescence drive signal of a light source, a correction value of luminance or saturation of image data, a cooling operation level, or the like. That is, the parameter is a parameter related to signal processing, luminescence operation, cooling operation, or various kinds of other processing or operation that the image display device performs at a time of image display.

In the image display device according to the present technology described above, it is conceivable that the later period mode setting unit performs a parameter setting to set an operating state, in the later period mode, suitable for a purpose of extending equipment lifetime.

For example, ensuring reduction in deterioration of a light source element by reducing luminescence drive current, ensuring reduction in deterioration of a part by strengthening operation of a cooling device, or the like, is in line with a purpose of extending equipment lifetime.

In the image display device according to the present technology described above, it is conceivable that the later period mode setting unit performs, as a later period mode, a parameter resetting a plurality of times.

For example, a multiple-time parameter resetting is conceivable, in which a later-period first mode is set at a time of entering a later period of the lifetime, and a later-period second mode is set according to subsequent development.

In the image display device according to the present technology described above, it is conceivable that the timing determination unit uses cumulative operation hours for determination of the mode change timing.

For example, a state in which cumulative operation hours of image display operation reaches a predetermined time is set to be the condition or one of the conditions for the mode change timing.

In the image display device according to the present technology described above, it is conceivable that the timing determination unit uses a value detected by a sensor for determination of the mode change timing.

The sensor is expected to be, for example, an illuminance sensor that detects illuminance of a luminescence unit of a projector, a current sensor that detects a laser current level, a housing open/close sensor for part replacement, an abnormality detection sensor for each of units, or the like.

In the image display device according to the present technology described above, it is conceivable that the later period mode setting unit uses a value detected by a sensor for parameter selection in the later period mode.

For example, the later period mode setting unit performs a parameter setting for the later period mode according to a value detected by an illuminance sensor, a current sensor, a housing open/close sensor, an abnormality detection sensor, or the like, the value being obtained during a period of the early period mode.

In the image display device according to the present technology described above, it is conceivable that the later period mode setting unit uses user operation log data for parameter selection in the later period mode.

The later period mode setting unit performs a parameter setting for the later period mode with reference to history of parameter operation by the user, for example, the history being stored as user operation log data.

In the image display device according to the present technology described above, it is conceivable that the use aspect information includes information of an equipment installation environment.

For example, the use aspect information is assumed to include information of an installation facility or location type as an equipment installation environment of the image display device. For example, the use aspect information is information with which an installation environment such as a school, a meeting room, a museum, an art museum, or an amusement park, can be expected.

In the image display device according to the present technology described above, it is conceivable that the use aspect information includes information of a period of equipment use.

Examples thereof include a daily period of use, or the like.

In the image display device according to the present technology described above, it is conceivable that the use aspect information acquisition unit acquires the use aspect information input in response to user operation.

For example, the image display device is configured such that the user can input use aspect information to an operation unit, and the use aspect acquisition unit acquires the input information.

An image display method according to the present technology includes acquiring use aspect information regarding an equipment use aspect, setting a parameter related to processing or operation executed at a time of image display on the basis of the acquired use aspect information and causing image display operation to be executed as an early period mode, determining mode change timing, and in response to determination that it is the mode change timing, resetting a parameter related to processing or operation executed at a time of image display and causing image display operation to be executed as the later period mode.

With this arrangement, a mode change is performed with the early period mode and the later period mode during a long period of time expected as equipment lifetime.

BRIEF DESCRIPTION OF DRAWINGS

FIG. 5 is an explanatory diagram of light emission from a light source unit of the projector according to the embodiments.

FIG. 8 is an explanatory diagram of a parameter set of an embodiment.

FIG. 9 is an explanatory diagram of a correspondence between an early period mode and a parameter set, and between a later period mode and a parameter set according to the first embodiment.

FIG. 15 is an explanatory diagram of a correspondence between an early period mode and a parameter set, and between the later period mode and a parameter set according to the fourth embodiment.

MODES FOR CARRYING OUT THE INVENTION

Hereinafter, embodiments will be described in the following order.
<1. Projector configuration>
<2. First embodiment>
<3. Second embodiment>
<4. Third embodiment>
<5. Fourth embodiment>
<6. Conclusion and modification>
<1. Projector Configuration>

Figure 1:
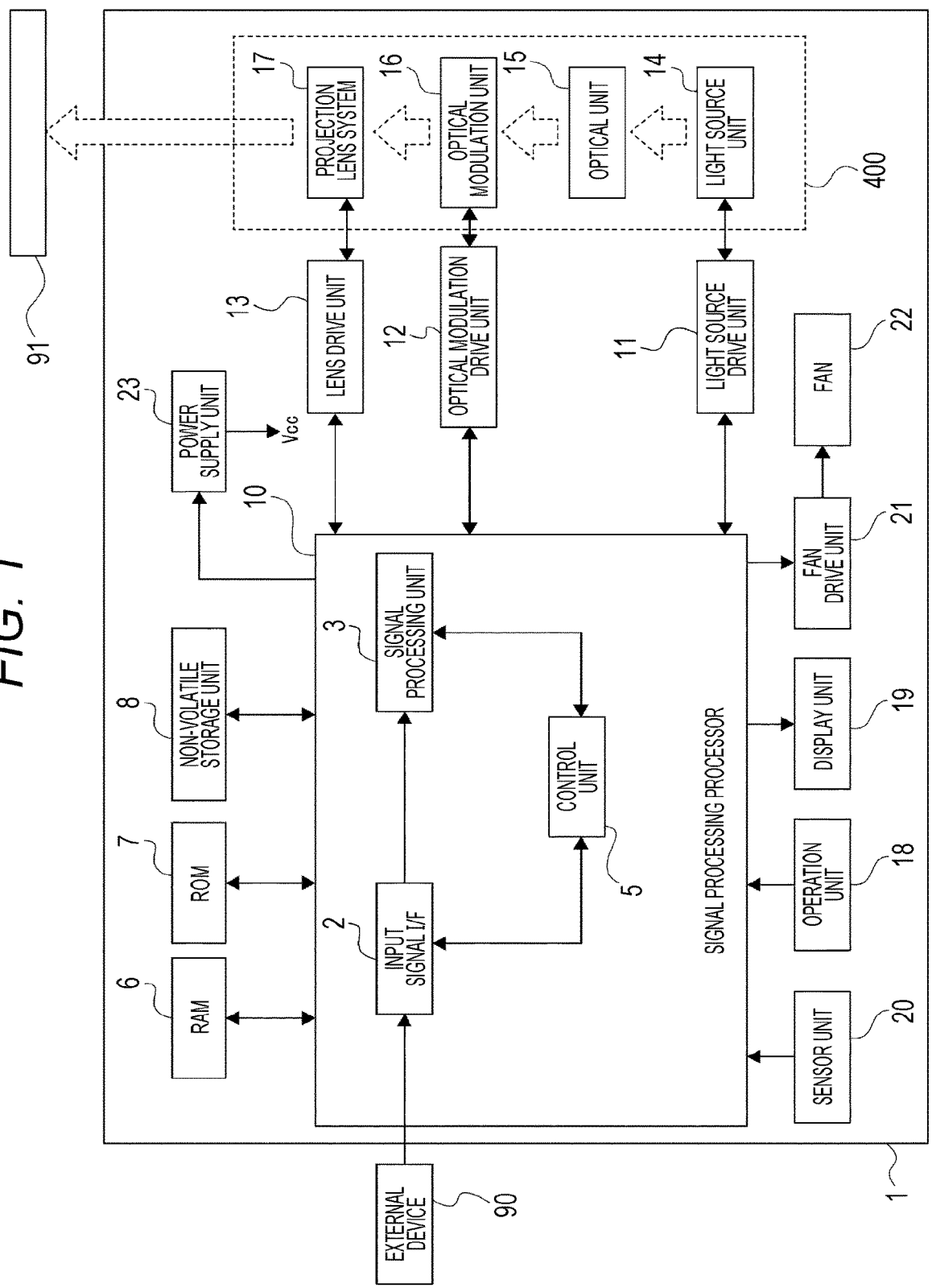
FIG. 1 is a block diagram of a projector according to embodiments of the present technology.

In the following embodiments, a projector 1 will be described as an example of an image display device. FIG. 1 illustrates a configuration of the projector 1.

The projector 1 is a device that receives an image signal supplied from external equipment 90 connected to the projector 1 and projects and displays an image on a screen 91. The image signal may be for either a still image or a moving image, and an image displayed on the screen 91 may be a still image or a moving image. Furthermore, a stereoscopic image may be displayed by an image signal for three-dimensions (3D).

The external equipment 90 is expected to be capable of functioning as an image signal supply device. For example, the external equipment 90 is expected to be a control device, signal switcher, or the like connected as an image signal source to the projector 1 when an image projection system is constructed. These pieces of equipment selectively supply image signals input from various kinds of other pieces of equipment to the projector 1. Furthermore, the external equipment 90 is expected to be a personal computer, a video playback device, a television tuner, a game machine, or the like, which is always connected, any of these pieces of equipment, which is not always connected, or the like.

Note that the external equipment 90 and the projector 1 may be connected by wire, or an image signal may be transmitted by wireless connection.

The projector 1 has a signal processing processor 10, a random access memory (RAM) 6, a read only memory (ROM) 7, a non-volatile storage unit 8, a light source drive unit 11, an optical modulation drive unit 12, a lens drive unit 13, an operation unit 18, a display unit 19, a sensor unit 20, a fan drive unit 21, a fan 22, a power supply unit 23, and an image projection unit 400.

The image projection unit 400 has a light source unit 14, an optical unit 15, an optical modulation unit 16, and a projection lens system 17, and projects an image on the basis of an image signal to display the image on the screen 91. Note that a structural example of the image projection unit 400 will be described later in FIG. 3.

An image signal supplied from the external equipment 90 is input to the signal processing processor 10.

The signal processing processor 10 includes, as processing functions by software or hardware for example, an input signal interface 2, a signal processing unit 3, and a control unit 5.

Note that although the signal processing processor 10 is formed by a one-chip computer, a digital signal processor (DSP), or the like as an example here, the input signal interface 2, the signal processing unit 3, or the control unit 5 may be separately formed.

The input signal interface 2 inputs an image signal from the external equipment 90 and transfers the signal to the signal processing unit 3 for signal processing.

The signal processing unit 3 is a function of performing signal processing for image display on an input image signal. That is, on the basis of the input image signal, the signal processing unit 3 performs various kinds of required processing, such as, for example, luminance processing, color processing, interpolation processing, gamma processing, contrast adjustment, sharpness adjustment, cutting out of an input image for creating a display image, or zooming, and finally generates image data of R (red), G (green), and B (blue) and supplies the image data to the optical modulation drive unit 12. The signal processing unit 3 performs such processing in response to a processing execution instruction from the control unit 5 or an instruction from a parameter.

The control unit 5 controls input/transfer of an image signal by the input signal interface 2, controls signal processing by the signal processing unit 3, or the like, and comprehensively controls image signal processing in the signal processing processor 10.

In the present embodiments, as will be described later, the control unit 5 reads a basic parameter setting for the early period mode and a later period mode from, for example, the non-volatile storage unit 8, and instructs the signal processing unit 3 to perform signal processing according to the parameter. The early period mode and the later period mode will be described later.

The RAM 6 is used as a frame memory area for temporarily storing an image signal, is used for software (a program), which is used by the signal processing processor 10, expanded therein, or is used as a work area for various kinds of calculations.

A program or static information for various kinds of processing by the signal processing processor 10 is stored in the ROM 7 or the non-volatile storage unit 8.

Furthermore, in a case of the present embodiments, the non-volatile storage unit 8 or the ROM 7 is also used for storing a parameter set for the early period mode and the later period mode, which will be described later.

The operation unit 18 is a part for inputting user operation, and is an operator such as an operation key or a dial provided on a housing of the projector 1, or a touch panel device using a screen as a user interface. Furthermore, the operation unit 18 may be configured as a reception unit of a remote controller so as to be capable of receiving and detecting operation performed by a user using the remote controller.

Moreover, the operation unit 18 is conceivable to be configured as a camera (image input device), a voice input device, or the like, so as to be capable of sensing operation by gesture or voice of the user.

Furthermore, the operation unit 18 may be configured as a communication unit that receives a command from peripheral equipment by communication via RS-232C, a network (local area network: LAN), or the like.

The operation unit 18 transmits operation information detected as user operation to the signal processing processor 10. The control unit 5 of the signal processing processor 10 performs required processing according to user operation.

Furthermore, in the non-volatile storage unit 8, the control unit 5 can store an operation log by the user using the operation unit 18. For example, the control unit 5 causes the operation log to be stored in response to operation, performed by the user, of adjusting brightness, hue, or the like of an image.

The display unit 19 is a display unit that performs various kinds of displays to the user (a user of the projector 1, or the like), and is a display device such as, for example, a liquid crystal display (LCD) or an organic electro-luminescence (EL) display provided in the housing of the projector 1 Alternatively, the display unit 19 may be a display device separate from the projector 1.

The display unit 19 performs various kinds of displays for a user interface. For example, the display unit 19 displays an operating state of the projector 1, a mode, a menu/icon, or the like.

In particular, in the present embodiments, the display unit 19 displays a message or operation icon for requesting the user to input use aspect information, as will be described later.

Note that, instead of providing the display unit 19, an image projected on the screen 91 by the image projection unit 400 may be used to display an operating state of the projector 1, a mode, a menu/icon, a message, or the like.

The sensor unit 20 comprehensively indicates various kinds of sensors provided in the projector 1.

Specifically, the sensor unit 20 is expected to be an illuminance sensor that detects brightness of an environment or image, a luminance sensor that detects luminance of a projected image, a current sensor that detects a light source drive current value, an open/close sensor that detects opening/closing of the housing of the projector 1 (for example, opening/closing of a door for filter replacement of the fan 22, or the like), or any one of various kinds of other sensors.

A detection signal of various kinds of sensors as the sensor unit 20 is supplied to the signal processing processor 10. In the signal processing processor 10, the control unit 5 confirms a detection signal, and performs various kinds of operation control or error detection.

The fan drive unit 21 includes a motor for rotating the fan 22 and a drive circuit thereof.

The control unit 5 instructs the fan drive unit 21 to rotate a fan at a required rotational rate. With this arrangement, the fan 22 is rotated to cool each of units of the projector 1.

The power supply unit 23 includes an AC/DC converter that inputs alternating current voltage from commercial alternating current power supply to generate direct current voltage, a DC/DC converter that generates power supply voltage of a voltage value required for each of the units, or the like, and supplies power supply voltage Vcc to the each of the units.

Turning on/off of power supply voltage supply operation by the power supply unit 23 is controlled by the control unit 5.

The light source drive unit 11 drives the light source unit 14 that is a projection light source. The light source unit 14 is conceivable to be any one of various kinds of light sources such as a laser light source, a light emitting diode (LED), a xenon lamp, or a mercury lamp, and the light source drive unit 11 is a circuit that drives such a light source to emit light.

The light source drive unit 11 generates luminescence drive current for a light source, such as a laser light source, in response to control by the control unit 5, and supplies the luminescence drive current to the light source.

The optical modulation drive unit 12 receives image data of R, G, and B from the signal processing unit 3, by which generates an R image signal, a G image signal, and a B image signal as liquid crystal drive signals, supplies the signals to light valves of R, G, B (liquid crystal light valves 240R, 240G, 240B which will be described later) in the optical modulation unit 16, and displays a red image, a green image, and a blue image.

According to an instruction from the control unit 5, the lens drive unit 13 drives the projection lens system 17 for focus adjustment for a projected image, size adjustment for a projected image, projection angle adjustment, or the like.

The image projection unit 400 has the light source unit 14, the optical unit 15, the optical modulation unit 16, and the projection lens system 17. The image projection unit 400 supplies light emitted from the light source unit 14 to the optical modulation unit 16 via the optical unit 15, and the optical modulation unit 16 generates image lights of R, G, and B with the liquid crystal light valves. Then, those image lights are combined and projected on the screen 91 by the projection lens system 17, by which an image is projected and displayed.

Figure 2:
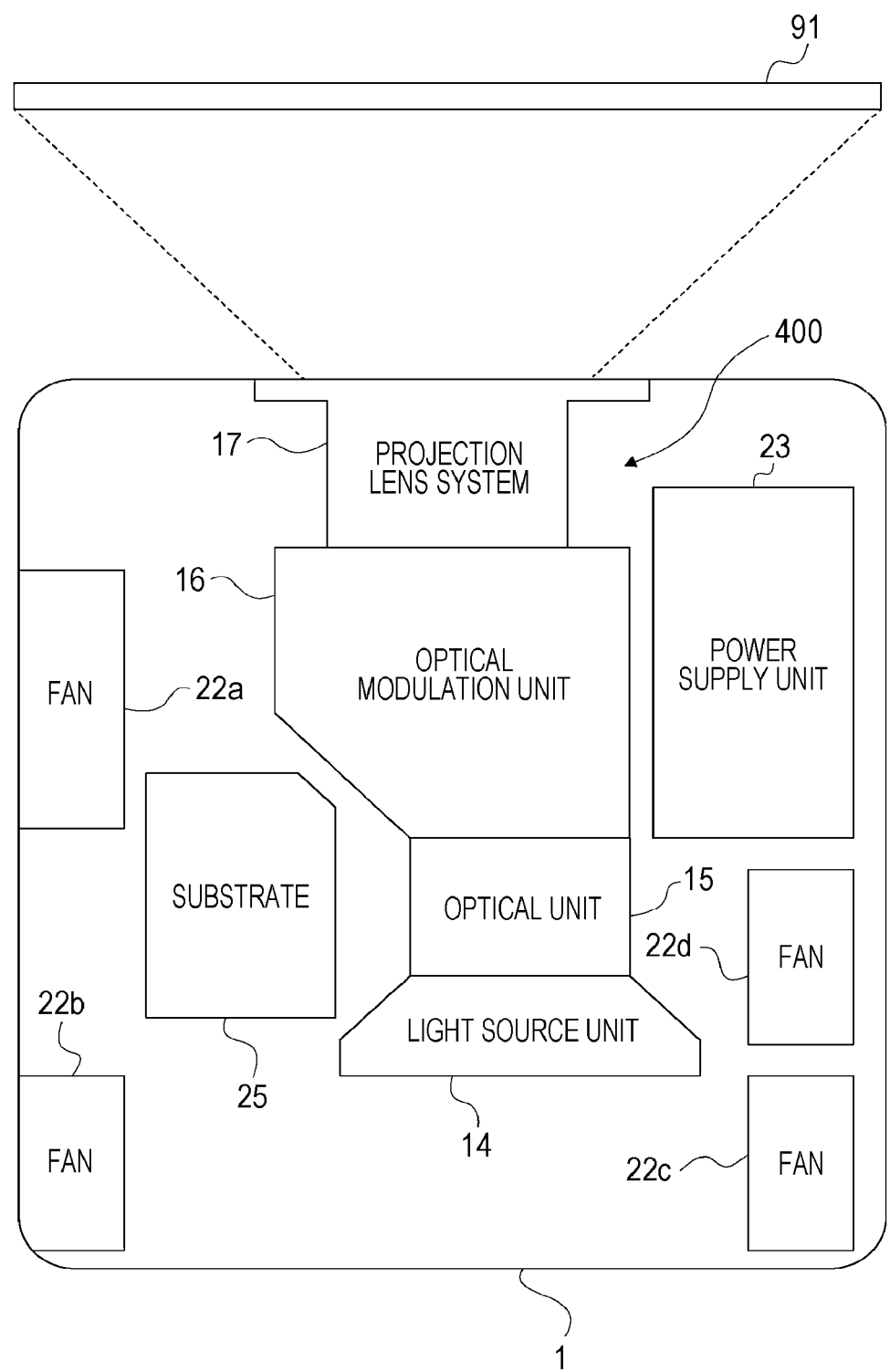
FIG. 2 is an explanatory diagram of an arrangement configuration example of the projector according to the embodiments.

FIG. 2 exemplifies rough arrangement inside the housing of the projector 1 including the configuration illustrated in FIG. 1 as described above.

As illustrated in the figure, the projection lens system 17 including the light source unit 14, the optical unit 15, the optical modulation unit 16, and the image projection unit 400 is arranged at a center in the housing, and a substrate 25 or the power supply unit 23 is arranged at a required peripheral position. Furthermore, a required number of fans 22 (22a, 22b, 22c, 22d) are arranged in the housing. For air cooling, air is blown by the fans 22 through predetermined flow paths, and the image projection unit 400, the substrate 25, and the power supply unit 23 are cooled.

Note that the substrate 25 is a substrate on which, for example, the signal processing processor 10, the RAM 6, the ROM 7, the non-volatile storage unit 8, the light source drive unit 11, the optical modulation drive unit 12, the lens drive unit 13, a part of the sensor unit 20, the fan drive unit 21, or the like, is mounted.

Figure 3:
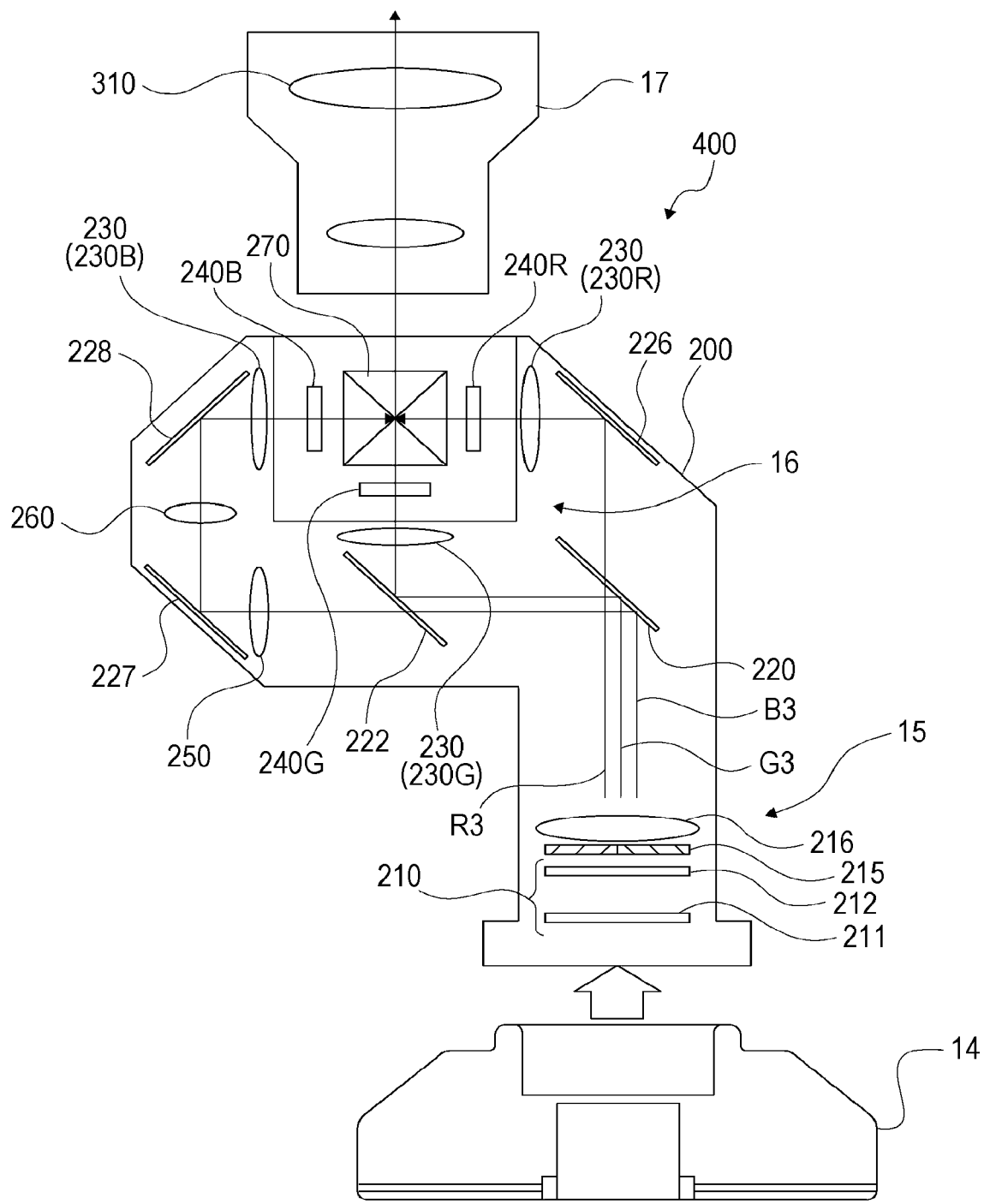
FIG. 3 is an explanatory diagram of a configuration of an image projection unit of the projector according to the embodiments.

A configuration of the image projection unit 400 will be described with reference to FIGS. 3, 4, and 5. The optical unit 15 has an integrator element 210, a polarization conversion element 215, a condenser lens 216, dichroic mirrors 220, 222, mirrors 226, 227, 228, and relay lenses 250, 260.

The optical modulation unit 16 has field lenses 230 (230R, 230G, 230B), liquid crystal light valves 240R, 240G, 240B, and a dichroic prism 270.

The integrator element 210 has a function to put, into a uniform luminance distribution as a whole, incident light with which the liquid crystal light valves 240R, 240G, and 240B are irradiated from the light source unit 14. For example, the integrator element 210 includes a first fly-eye lens 211 having a plurality of unillustrated microlenses arranged in two dimensions, and a second fly-eye lens 212 having a plurality of microlenses arranged so as to correspond to each of the microlenses of the first fly-eye lens 211.

Parallel light that enters the integrator element 210 from the light source unit 14 is divided into a plurality of light fluxes by the microlenses of the first fly-eye lens 211 and forms an image on each of corresponding microlenses of the second fly-eye lens 212. Each of the microlenses of the second fly-eye lens 212 functions as a secondary light source and irradiates the polarization conversion element 215 with a plurality of parallel lights as incident light.

The polarization conversion element 215 has a function to align a polarization state of incident light that enters via the integrator element 210, or the like. The polarization conversion element 215 emits light including blue light B3, green light G3, and red light R3 via, for example, the condenser lens 216 arranged on an emission side of the light source unit 14.

The dichroic mirrors 220 and 222 have a property of selectively reflecting colored light in a predetermined wavelength range and transmitting light in other wavelength ranges.

For example, the dichroic mirror 220 selectively reflects the green light G3 and the blue light B3 and transmits the red light R3.

The dichroic mirror 222 selectively reflects the green light G3 among the green light G3 and blue light B3 reflected by the dichroic mirror 220.

The remaining blue light B3 is transmitted through the dichroic mirror 222. With this arrangement, light emitted from the light source unit 14 is separated into a plurality of colored lights of different colors.

Separated red light R3 is reflected by the mirror 226, is collimated by passing through the field lens 230R, and then enters the liquid crystal light valve 240R for red light modulation.

Green light G3 is collimated by passing through the field lens 230G, and then enters the liquid crystal light valve 240G for green light modulation.

Blue light B3 passes through the relay lens 250 and is reflected by the mirror 227, and then, possess through the relay lens 260 and is reflected by the mirror 228. The blue light B3 reflected by the mirror 228 is collimated by passing through the field lens 230B, and then enters the liquid crystal light valve 240B for blue light modulation.

The liquid crystal light valves 240R, 240G, 240B are driven by the optical modulation drive unit 12 illustrated in FIG. 1. That is, the liquid crystal light valves 240R, 240G, 240B modulate incident light for each pixel on the basis of image signals of the respective colors supplied from the optical modulation drive unit 12, and generate a red image, a green image, and a blue image, respectively. The modulated light of the respective colors (formed image) enters the dichroic prism 270 and is combined.

The dichroic prism 270 superimposes and combines light of the respective colors entered from three directions, and emits light toward the projection lens system 17.

The projection lens system 17 has a plurality of lenses 310 or the like, and irradiates the screen 91 (refer to FIG. 1) with the light combined by the dichroic prism 270. With this arrangement, a full-color image is displayed.

Next, a configuration example of the light source unit 14 will be described.

Figure 4:
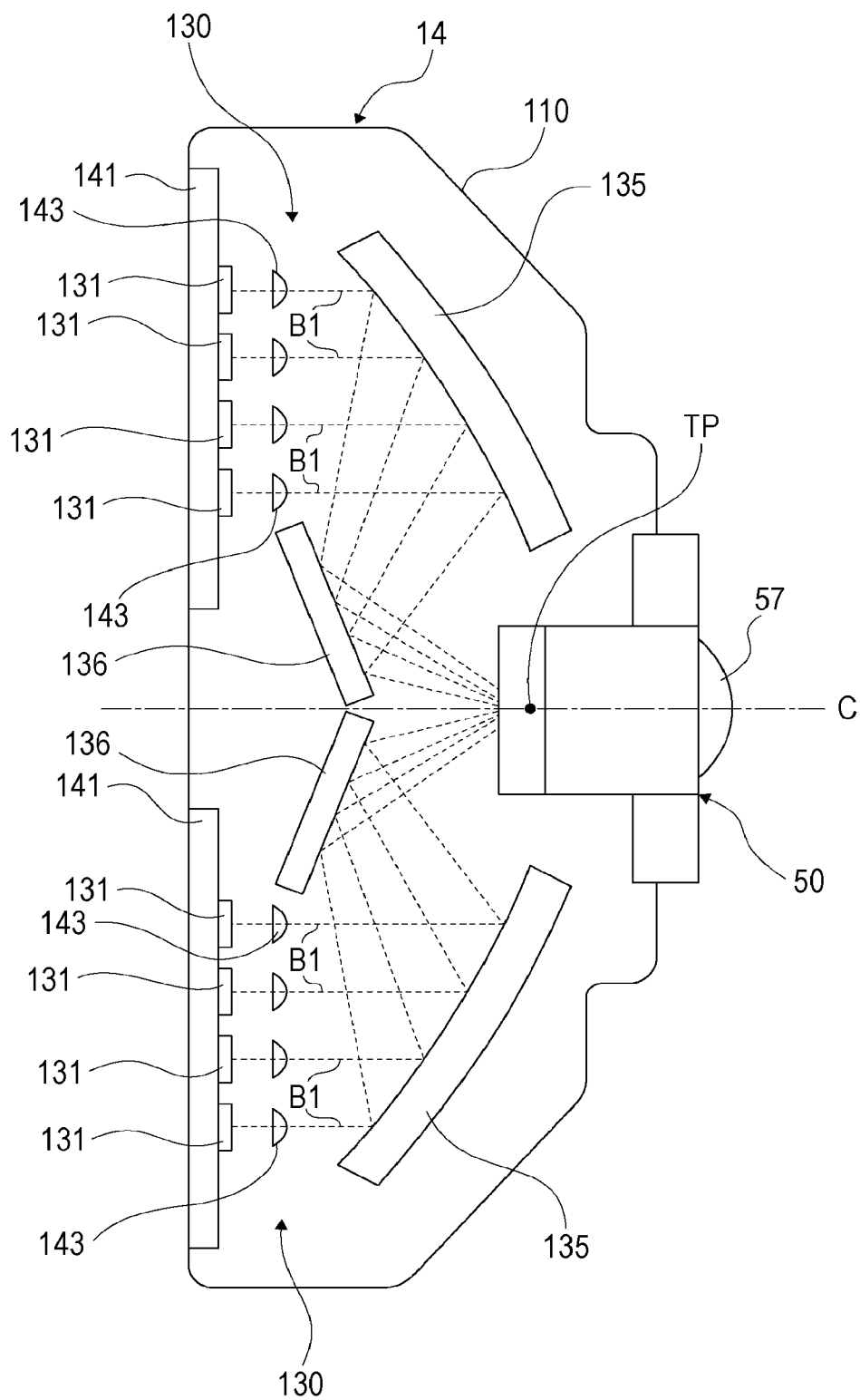
FIG. 4 is an explanatory diagram of a configuration of a light source unit of the projector according to the embodiments.

FIG. 4 schematically illustrates an inside of a housing unit 110 of the light source unit 14.

As illustrated in the figure, two light-condensing units 130 that condense light are formed in the light source unit 14. The two light-condensing units 130 are arranged on a back side of a fluorescent optical unit 50. The light-condensing units 130 are arranged symmetric with respect to an optical axis C.

Each of the light-condensing units 130 has, for example, a laser light source 131 that emits laser light as a light source that emits excitation light in a first wavelength range. For example, a plurality of laser light sources 131 is provided.

The plurality of laser light sources 131 is, for example, a blue laser light source capable of oscillating blue laser light B1 having a peak wavelength of luminescence intensity within a wavelength range of 400 nm or more and 500 nm or less as a first wavelength range. As the laser light source 131, another solid state light source such as an LED may be used instead of a light source that emits laser light.

The plurality of laser light sources 131 is arranged on the mounted substrate 141.

In each of the light-condensing units 130, a collimator lens 143 is provided corresponding to a position of each of the laser light sources 131. The collimator lens 143 is a rotationally symmetric aspherical lens, and causes the blue laser light B1 emitted from each of the laser light sources 131 to be a substantially parallel light flux.

Each of the light-condensing units 130 also has an aspherical mirror 135 and planar mirror 136 as a condensing optical system that condenses each of laser light B1, which is emitted from the plurality of laser light sources 131, on a predetermined light-condensing area (or light-condensing point) TP.

The aspherical mirror 135 reflects light emitted from the plurality of laser light sources 131 and condenses the light on the planar mirror 136. The planar mirror 136 reflects emitted light, which is reflected by the aspherical mirror 135, so that the emitted light is condensed on the predetermined light-condensing area TP as described above. As will be described later, the light-condensing area TP is arranged on a phosphor layer 53 of a phosphor unit included in the fluorescent optical unit 50.

FIG. 5A schematically illustrates the fluorescent optical unit 50. The fluorescent optical unit 50 includes a phosphor unit 58 and a fluorescent light collimator lens 57.

The phosphor unit 58 includes a transparent substrate 51, which is a disk-shaped rotating plate, a motor 52 as a drive unit that rotates the transparent substrate 51, and the phosphor layer 53 provided on one surface side of the transparent substrate 51.

The transparent substrate 51 functions as a support body that supports the phosphor layer 53. For convenience of description, among both surfaces of the transparent substrate 51, a surface of a side the blue laser light B1 enters is referred to as a first surface, and a surface of a side opposite to the first surface is referred to as a second surface.

FIGS. 5B and 5C are plan views illustrating the first surface and second surface of the transparent substrate 51, respectively. An antireflection layer 55 is provided on the first surface of the transparent substrate 51. The phosphor layer 53 is provided on a second surface side of the transparent substrate 51, and a dichroic layer 54 (refer to FIG. 5A) is provided between the transparent substrate 51 and the phosphor layer 53.

The antireflection layer 55 has a function to transmit the blue laser light B1 to reduce reflection of the antireflection layer 55. The blue laser light B1 transmitted through the antireflection layer 55, the transparent substrate 51, and the dichroic layer 54 enters, as excitation light, the phosphor layer 53.

The phosphor layer 53 has a function to transmit a portion of the blue laser light B1 entered as excitation light (including scattered and transmitted light) and absorb rest of the light. Due to the absorbed excitation light, the phosphor layer 53 generates light having a second wavelength range longer than a wavelength range of the excitation light.

The phosphor layer 53 combines blue light B2 transmitted as described above and light having the second wavelength range, which is yellow light including red light R2 and green light G2 (for example, light with a peak wavelength of 500 to 600 nm), and emits the combined light. That is, the phosphor layer 53 emits white light.

The dichroic layer 54 has a function to transmit the blue laser light B1 transmitted through the transparent substrate 51 and reflect the yellow light generated in the phosphor layer 53. The dichroic layer 54 includes, for example, dielectric multilayer film.

As illustrated in FIG. 5A, relative arrangement of the light-condensing unit 130 and the fluorescent optical unit 50 is designed so that the light-condensing area TP is at a position where the phosphor layer 53 is arranged.

Width of the phosphor layer 53 in a radial direction is set to be more than a spot size of the light-condensing area TP. A similar applies to width of the dichroic layer 54 in the radial direction Although width of the antireflection layer 55 in the radial direction is set to be more than the width of the phosphor layer 53, the width of the antireflection layer 55 in the radial direction may be a same as the width of the phosphor layer 53.

A rotation axis 56 of the motor 52 coincides with a center of the transparent substrate 51 on which each of these layers is formed. When excitation light enters the phosphor layer 53, an irradiation position of the excitation light moves on a circumference with respect to the phosphor layer 53 with time by the motor 52 rotating the transparent substrate 51. With this arrangement, it is possible to suppress an increase in temperature of the irradiation position in the phosphor layer 53, and to prevent a decrease in luminescence efficiency of the phosphor layer 53.

Furthermore, it takes some time (for example, about several nsec) for a phosphor atom to absorb excitation light and emit light, and even if the phosphor atom is irradiated with next excitation light during the excitation period, the phosphor atom does not emit light for the next excitation light. However, because the irradiation position of the excitation light of the phosphor layer 53 moves with time, unexcited phosphor atoms are arranged one after another at the irradiation position of the excitation light, and the phosphor layer 53 can be caused to emit light efficiently.

Thus, the motor 52 and the transparent substrate 51 function as a moving mechanism that moves the phosphor layer 53 with time.

Rotation of the motor 52 is performed by a motor drive signal being supplied from the light source drive unit 11 according to control by the control unit 5. A rotational rate of the motor 52 is determined by a parameter instructed by the control unit 5.

The fluorescent light collimator lens 57 has a function to cause light emitted from the phosphor layer 53 to be substantially parallel light. An optical axis of the fluorescent light collimator lens 57 (optical axis C in FIG. 5A) is arranged at a position deviated from the rotation axis 56 of the motor 52.

<2. First Embodiment>

In a projector 1 having the above configuration, operation and functions for the operation according to a first embodiment will be described.

In the present embodiment, the projector 1 controls an early period mode and later period mode in a period expected as equipment lifetime of the projector 1.

Here, the early period and the later period are, for example, an early period and later period through a long-term use period, and it is expected that, for example, a first five years or so falls within the early period and a subsequent period falls within the later period, estimating that a durable life of equipment in use (equipment lifetime) is ten years or so.

Then, an early period mode is a basic mode for a period from time when the projector 1 is shipped, is installed at a location where projection display is performed, and starts to be used for first time to mode change timing. Although the mode change timing is not necessarily fixed, the mode change timing indicates timing of shift from the early period to the later period.

The later period mode is a basic mode for shifting to the mode change timing.

Note that, although the early period mode and the later period mode are referred to as a "basic mode" of the early period and the later period, respectively, the mode means a mode as a basic parameter setting. Although, normally, various "mode" functions selectable by a user may be implemented in equipment, the basic mode here means, for example, a mode as a parameter setting state executed when the user does not particularly specify a mode, a mode as a parameter setting state before the user performs individual parameter operation, or the like.

Therefore, a parameter setting state for a case where the user who is not particularly conscious of image quality, brightness, a cooling function, or the like. normally uses the projector 1 is defined as the early period mode or the later period mode.

Figure 6:
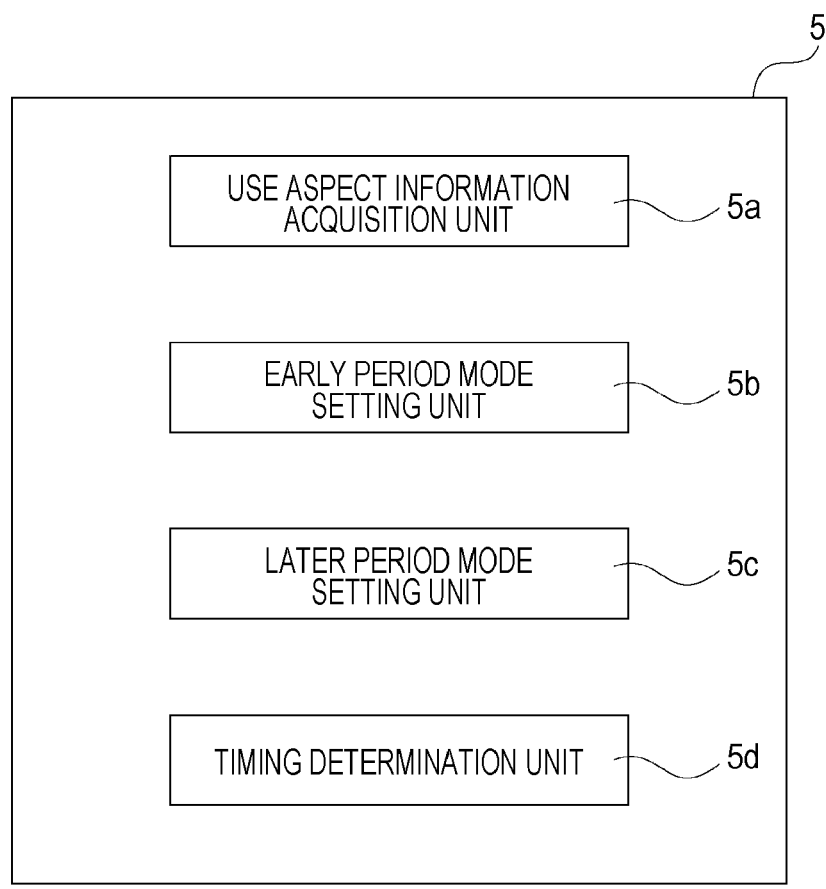
FIG. 6 is an explanatory diagram of a functional configuration of a control unit according to the embodiments.

In order to perform each of parameter settings for the early period mode and the later period mode, a control unit 5 includes a functional configuration as a use aspect information acquisition unit 5a, an early period mode setting unit 5b, a later period mode setting unit 5c, and a timing determination unit 5d, which are illustrated in FIG. 6. For example, each of these functions is implemented by software in the control unit 5.

The use aspect information acquisition unit 5a is a function to acquire use aspect information regarding an equipment use aspect. For example, with a function as the use aspect information acquisition unit 5a, the control unit 5 prompts the user to display a question on the display unit 19, and receives answer operation for the question as input to the operation unit 18. For example, a question is asked in a menu format, and the corresponding answer is selected according to user operation.

The question here is expected to be, for example,

Period of use ("How long do you use it in a day?", or the like),

Installation location ("What kind of location did you install it?", or the like), Status of concurrent use ("Do you perform projection with one unit or multiple units?", or the like), or the like.

Thus, it is desirable to set a question that a user can answer even if the user is not familiar with a specification, an operation method, or the like of the projector 1.

Although the user may directly input a number for the question about period of use, it is more preferable to display options such as, for example, "1 hour or less", "about 2 to 5 hours", "5 to 10 hours or more", "10 to 20 hours", and "always" and prompt the user to make a selection.

For the question about the installation location also, it is preferable to display options such as, for example, "meeting room", "classroom", "amusement park/theme park", and "museum/art museum", and prompt the user to make a selection.

For the question about a status of concurrent use, similarly, it is more preferable to display options such as, for example, "1 unit" and "multiple units" and prompt the user to make a selection.

The use aspect information acquisition unit 5a acquires such an answer from the user as use aspect information.

Of course, there are various kinds of possible questions. For example, there may be questions such as "Do you want to display brightly?", or "Is it a quiet location?".

Furthermore, a voice output function may be included to output a question as a voice message and prompt the user to answer.

Furthermore, it is also conceivable to include a voice recognition function to receive operation (answering) by voice of the user.

Note that it is also possible to acquire use aspect information by inter-equipment communication or by detection information from the sensor unit 20 without relying on operation by the user. For example, the sensor unit 20 may include an imaging device or a microphone, and the use aspect information acquisition unit 5a may estimate an environment of an installation location with an image analysis or voice analysis of an image or voice from the sensor unit 20 and acquire use aspect information as an estimation result.

Furthermore, because communication is made across the projectors 1 used simultaneously for synchronization, a status of concurrent use can be automatically determined according to presence of a communication connection.

The early period mode setting unit 5b is a function that sets a parameter related to processing or operation executed at a time of image display on the basis of use aspect information acquired by the use aspect information acquisition unit 5a, and executes image display operation as an early period mode.

That is, by performing a parameter setting suitable for information of a period of use, an installation location, and a status of concurrent use, image display in a desirable state for the user who has introduced the projector 1 can be performed.

Exemplifying an installation location, for example, there are a location such as an amusement park where image display is desired to be bright as possible, a location in a dim environment such as a museum where image display is desired to be with subdued brightness, a location such as a meeting room where image display is sufficient with normal brightness, or the like.

Furthermore, regarding the period of use, length of the period of use affects heating of the light source unit 14 and also affects a progress of deterioration of a light source element due to the heating. Therefore, there is a circumstance where it is better to subdue brightness to some extent in a case of a long period of use, even in a location where image display is desired to be as bright as possible. Furthermore, there is also a difference between a location where sound of the fan 22 (rotation noise of the fan 22) is bothering and a location where the sound of the fan 22 is not bothering.

For a status of concurrent use, it is desired to perform image display with a same image quality across a plurality of projectors 1, and therefore, adjustment between the equipment is required.

In a situation where there are these different circumstances according to a use aspect as each of the examples described above, the early period mode setting unit 5b performs a parameter setting suitable for a current usage environment.

The later period mode setting unit 5c is a function that resets a parameter related to processing or operation executed at a time of image display in response to determination that it is the mode change timing, and executes image display operation as the later period mode.

While the early period mode by the early period mode setting unit 5b is a parameter setting suitable for a usage environment, the later period mode by the later period mode setting unit 5c is a parameter setting appropriate for extending equipment lifetime as long as possible.

The timing determination unit 5d is a function to determine mode change timing from the early period mode to the later period mode.

For example, the timing determination unit 5d performs determination using cumulative operation hours or a detection signal from the sensor unit 20.

Figure 7:
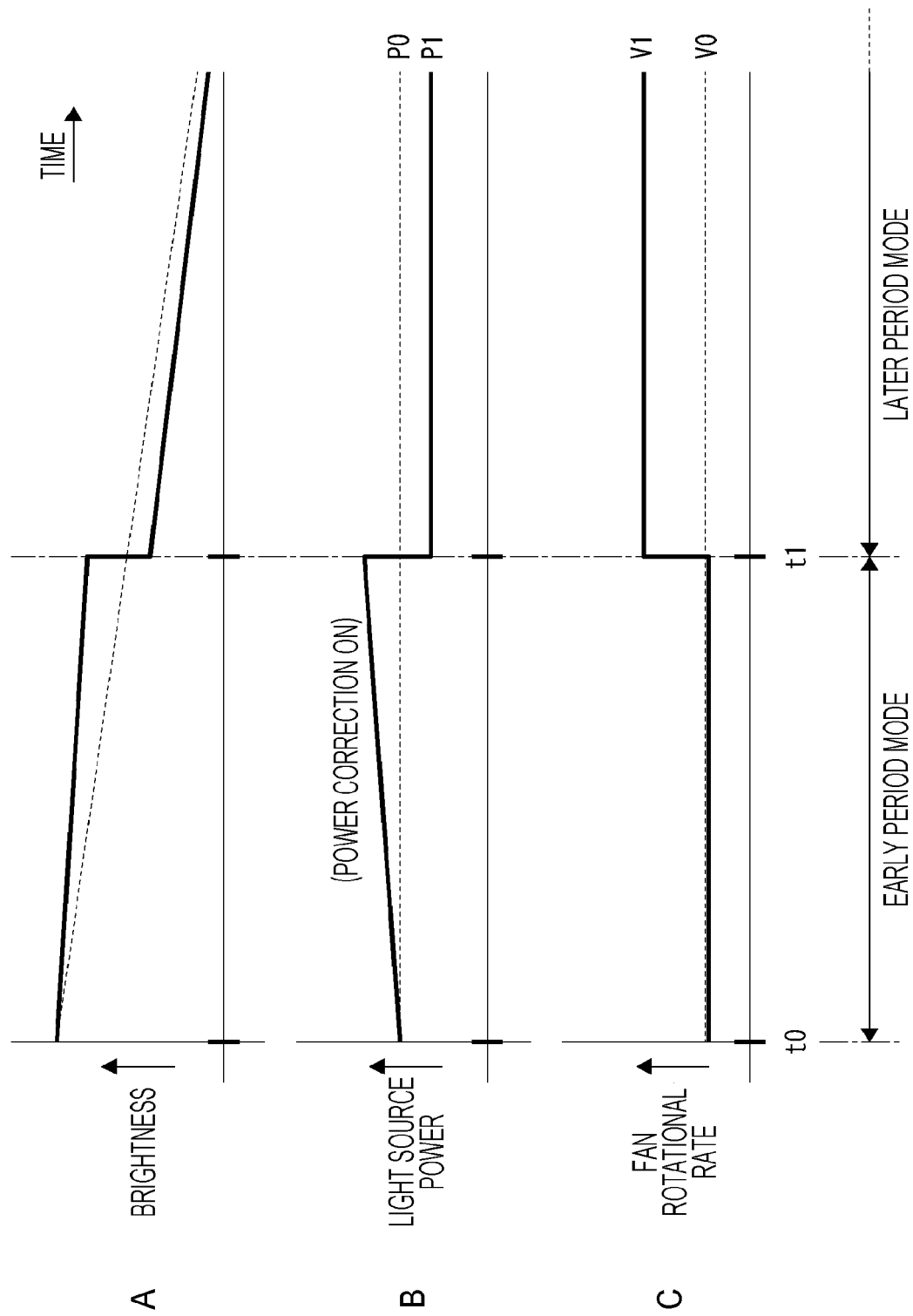
FIG. 7 is an explanatory diagram of a mode change operation according to a first embodiment.

FIG. 7 illustrates an operation example of the early period mode and the later period mode executed by these functions. Described here is an example of changing parameter settings of light source power (a luminescence drive current value) and a fan rotational rate for each of the early period mode and the later period mode.

In FIGS. 7A, 7B, and 7C, a horizontal axis represents time.

FIG. 7A illustrates a change in brightness of a projected image.

FIG. 7B illustrates a change in light source power (a luminescence drive current value provided to the laser light source 131). The change corresponds to a change in an amount of light emitted from the laser light source 131.

FIG. 7C illustrates a change in rotational rate control of the fan 22.

Then, in FIGS. 7B and 7C, a solid line indicates a change in the light source power and the fan rotational rate due to a parameter setting in the early period mode and later period mode, and a broken line indicates a case where parameter control is not performed (in a case where a parameter is constant). The solid line in FIG. 7A indicates a change in brightness of a projected image achieved by parameter settings in the early period mode and the later period mode, and the broken line indicates a change in brightness of the projected image in a case where parameter control is not performed.

In FIGS. 7B and 7C, light source power "P0" indicated by a broken line represents a normal luminescence drive current value (in a case where the early period mode is not expected), and a fan rotational rate "V0" represents a normal fan rotational rate.

In a case where a parameter setting is not changed as illustrated by the broken lines in FIGS. 7B and 7C, the brightness of the projected image gradually decreases due to deterioration of the laser light source 131, or the like, as indicated by the broken line in FIG. 7A.

Here, it is assumed that a period from start of using the projector 1 to a time point t1 is the early period. Note that the time point t1 at an end of the early period is determined by a function of a timing setting unit 5d, and there may be a case where the time point t1 is a fixed timing such as 10,000 hours from the start of use, or there may be a case where the time point t1 is indefinite by being determined according to a sensing status, or the like.

In the early period up to the time point t1, as the early period mode, a parameter for laser power correction on/off is set to "on" and a fan rotational rate setting parameter is set to "V0". The laser power correction is, for example, processing to chronologically correct a luminescence drive current value so that brightness of the projected image becomes constant (or a degree of a decrease in brightness becomes gentle). That is, the laser power correction is processing to gradually increase the luminescence drive current value in order to cope with a decrease in brightness of the projected image due to aging deterioration.

According to such an early period mode, brightness of the projected image is maintained as high luminance as possible, and fan noise is low provided that the fan rotational rate is a value at which the normal rotational rate "V0" is relatively subdued. That is, the early period mode in this case is set for a case where it is determined from the use aspect information that a state of "bright and quiet" is desirable.

The later period mode is controlled provided that time after the time point t1 is the later period. In this example, the laser power correction on/off parameter is set to "off", and laser power (luminescence drive current value) is set to "P1", which is lower than a normal value "P0".

Furthermore, the fan rotational rate setting parameter is set to "V1", which is higher than a normal value "V0". That is, a cooling function is enhanced while suppressing the laser power.

According to such a later period mode, progress of deterioration of each of parts including the laser light sources 131 is hindered while allowing for a decrease in brightness of the projected image. That is, the later period mode in this case meets a purpose of "extending equipment lifetime as long as possible".

Although FIG. 7 above is an example, in this way, image projection operation is initially executed in the early period mode, and then the early period mode and the later period mode are switched at a time point t1, which is a mode change timing.

In the early period mode, an answer (use aspect information) input by the user regarding period of use, an installation location, a status of concurrent use, or the like, is referred to, and a parameter setting suitable for the use aspect is performed.

In the later period mode, a parameter setting is performed to extend equipment lifetime as long as possible.

As a specific method for this, it is conceivable to store various kinds of parameter sets PS (PS1, PS2 . . . ) in the non-volatile storage unit 8 or ROM 7 as illustrated in FIG. 8 for example.

For example, a parameter related to luminescence drive current, a parameter related to luminance adjustment, a parameter related to saturation adjustment, a parameter related to a fan rotational rate, a parameter related to a phosphor wheel rotational rate, or the like are put into one set and stored as a parameter set PS1, PS2, PS . . . .

Note that, as the parameter related to luminescence drive current, a parameters for the laser power correction on/off, a power-down coefficient, power-up coefficient, a luminescence drive current value, or the like is conceivable.

The parameter related to luminance adjustment is a parameter related to luminance signal processing of an image signal provided to the liquid crystal light valves 240R, 240G, 240B. For example, a parameter for a luminance correction coefficient, a gradation correction on/off, a contrast adjustment value, or the like is conceivable.

The parameter related to saturation adjustment is a parameter related to color adjustment processing of an image signal provided to the liquid crystal light valves 240R, 240G, 240B. For example, a parameter for a saturation correction coefficient, a saturation correction on/off, or the like is conceivable.

As the parameter related to a fan rotational rate, a rotational rate of the fan 22, on/off of rotational rate adaptive control (rotational rate variable control according to temperature detection), or the like is conceivable.

The parameter related to a phosphor wheel rotational rate is a parameter related to the rotational drive of the fluorescent optical unit 50 by the motor 52, and, for example, the rotational rate of the fluorescent optical unit 50 is expected.

Note that, for rotation of the fluorescent optical unit 50, there is a range of rotational rate with which image quality does not deteriorate due to generation of flicker in a projected image, or the like. For example, the rotation of the fluorescent optical unit 50 falls within a range of rotational rate in which a margin range is allowed in vicinity of an optimal rotational rate in terms of image quality. Here, because the higher a rotational rate, the more a cooling effect can be obtained and lifetime of a phosphor is extended, in a case of prioritizing equipment lifetime, the rotational rate may be increased even if the image quality slightly deteriorates (not optimal). In that sense, the parameter related to a phosphor wheel rotational rate can be used as an example of a parameter applied to the early period mode and the later period mode.

For example, some of the parameter set PS1, PS2, PS3 . . . described above in which various kinds of parameters are regarded as parameter set that adapt various kinds of use aspects that can be used in the early period mode, and some of the parameter set PS1, PS2, PS3 . . . are parameter set that can be used for the later period mode.

As exemplified in FIG. 9, a parameter set PS1, PS2 . . . PS10 is prepared for a purpose of operation that adapts a use aspect of the user in the early period. FIG. 9 illustrates an example in which a parameter set PS11, PS2 . . . PS20 is prepared to perform operation serving a purpose of prioritizing equipment lifetime in the later period.

Of course, each set of 10 parameters is just an example for explanation.

The parameter set PS1, PS2 . . . PS10 for the early period mode is set to be selected in order to implement an early period mode suitable for each of various kinds of use aspects.

For example, taking brightness of a projected image and fan noise as an example, expected demands suitable for a use aspect (especially an installation location) are:
"brightness is required, and low noise is required",
"brightness may be normal, but low noise is required",
"brightness may be low, but low noise is required",
"brightness is required, but noise does not matter",
"brightness should be normal, and noise does not matter",
"brightness may be low, and noise does not matter", and the like.

For example, in a case of use in a quiet museum with low lighting, "brightness may be low, but low noise is required", and in a case of use in an outdoor attraction in a noisy amusement park, "brightness is required, but noise does not matter".

Furthermore, although brightness is required, it is preferable to provide difference to a degree of increasing brightness depending on length of period of use. For example, in a case of continuous use for a long time, keeping brightness at full power of light source power may excessively deteriorate the light source unit 14, and therefore, it is appropriate to reduce a degree of increasing the light source power, or the like.

In order to allow for selection of an appropriate parameter set PS according to a demand or circumstance according to these various kinds of use aspects, the parameter set PS1, PS2 . . . PS10 for the early period mode is previously prepared.

Meanwhile, a parameter set PS11, PS12 . . . PS20 for the later period mode is a set of parameters each of which serving an idea of extending equipment lifetime as long as possible. For example, one of the parameters may set light source power low, another one of the parameters may increase a fan rotational rate, or the like. Although, in that sense, it is sufficient to provide only one parameter set for prioritizing equipment lifetime, it is desirable to include a plurality of parameter sets PS11, PS12 . . . PS20 in which, still on premise of giving priority to equipment lifetime, each of the parameters is adjusted in order to allow for selection of a suitable parameter set PS according to, for example, a use aspect, a using process in the early period, user operation while the equipment is being used, or the like.

Examples of processing to execute operation in the early period mode and in the later period mode performed by using such parameter sets PS will be described with reference to FIGS. 10 and 11.

Figure 10:
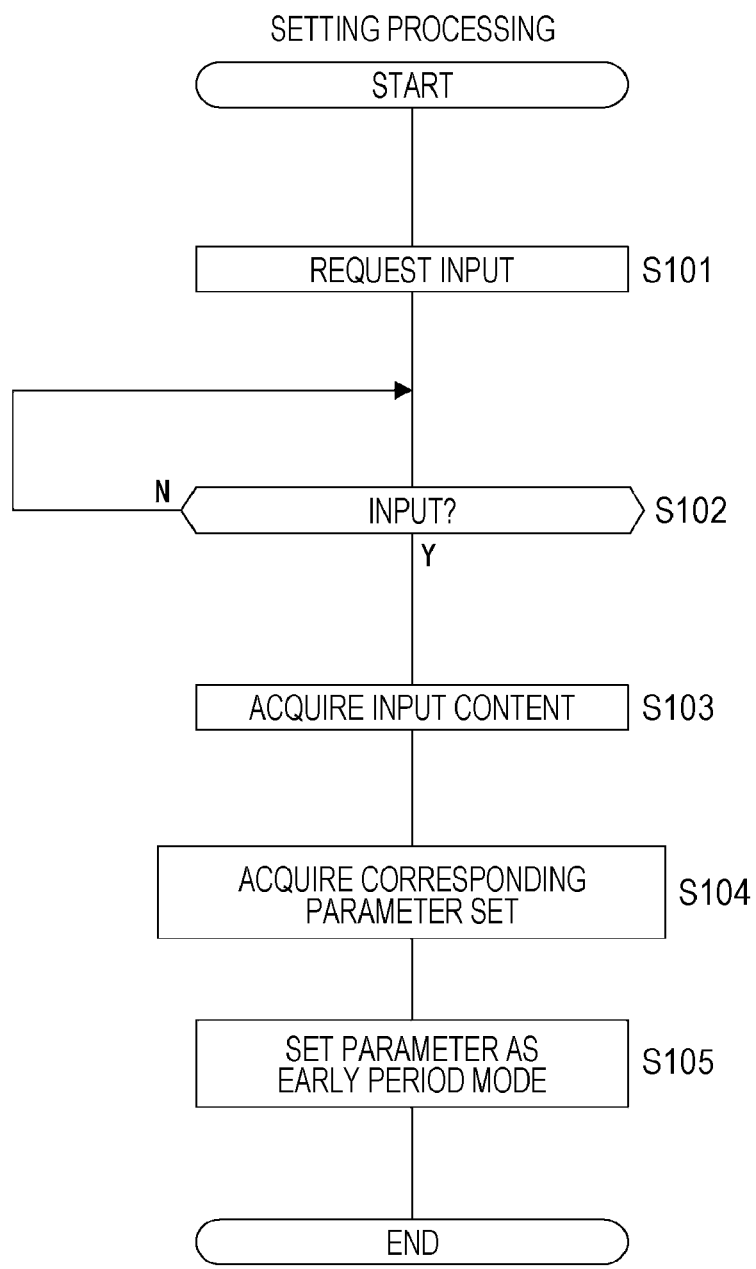
FIG. 10 is a flowchart of setting processing according to the first embodiment.

First, FIG. 10 illustrates processing to set the early period mode by the control unit.

For example, in a case of starting to use the projector 1, the control unit 5 performs the processing illustrated in FIG. 10 as one of initial processing.

In Step S101, the control unit 5 performs an input request to the user. For example, the control unit 5 displays a question such as "How long do you use it in a day?" or "What kind of location did you install it?" on the display unit 19, and be in a standby state for input operation for answer by the user in Step S102.

In a case where an input is made by the user, the control unit 5 acquires input content as use aspect information in Step S103.

Then, in Step S104, the control unit 5 selects an adaptive parameter set PS from the parameter sets PS for the early period mode stored in the non-volatile storage unit 8, for example, on the basis of the use aspect information, and acquires a value of each of the parameters.

In Step S105, the control unit 5 instructs each of the acquired parameters to each of the units, by which operation as the early period mode can be executed.

For example, the control unit 5 sets, to the light source drive unit 11, a parameter related to luminescence drive current or a parameter related to a phosphor wheel rotational rate. Furthermore, the control unit 5 sets, to the signal processing unit 3, a parameter related to luminance adjustment or saturation adjustment. Furthermore, the control unit 5 sets, to the fan drive unit 21, a parameter related to a fan rotational rate.

Thus, the early period mode is set as a basic mode for a period from start of using the projector 1 and after. Each of the parameters of the early period mode is, for example, a parameter initially set when power is turned on.

Of course, although a parameter may be changed during use by operation by the user, becomes a basic mode in the early period by setting a parameter as the early period mode to be enabled every time the power is turned on or a parameter is reset. In that sense, each of the parameters selected for the early period mode set to a default value in the early period.

In a period during which operation of the early period mode is performed by the above processing, timing to enter the later period is determined, and when the timing to enter the later period comes, a change to the later period mode is performed. FIG. 11 illustrates an example of such mode change processing by the control unit 5.

Figure 11:
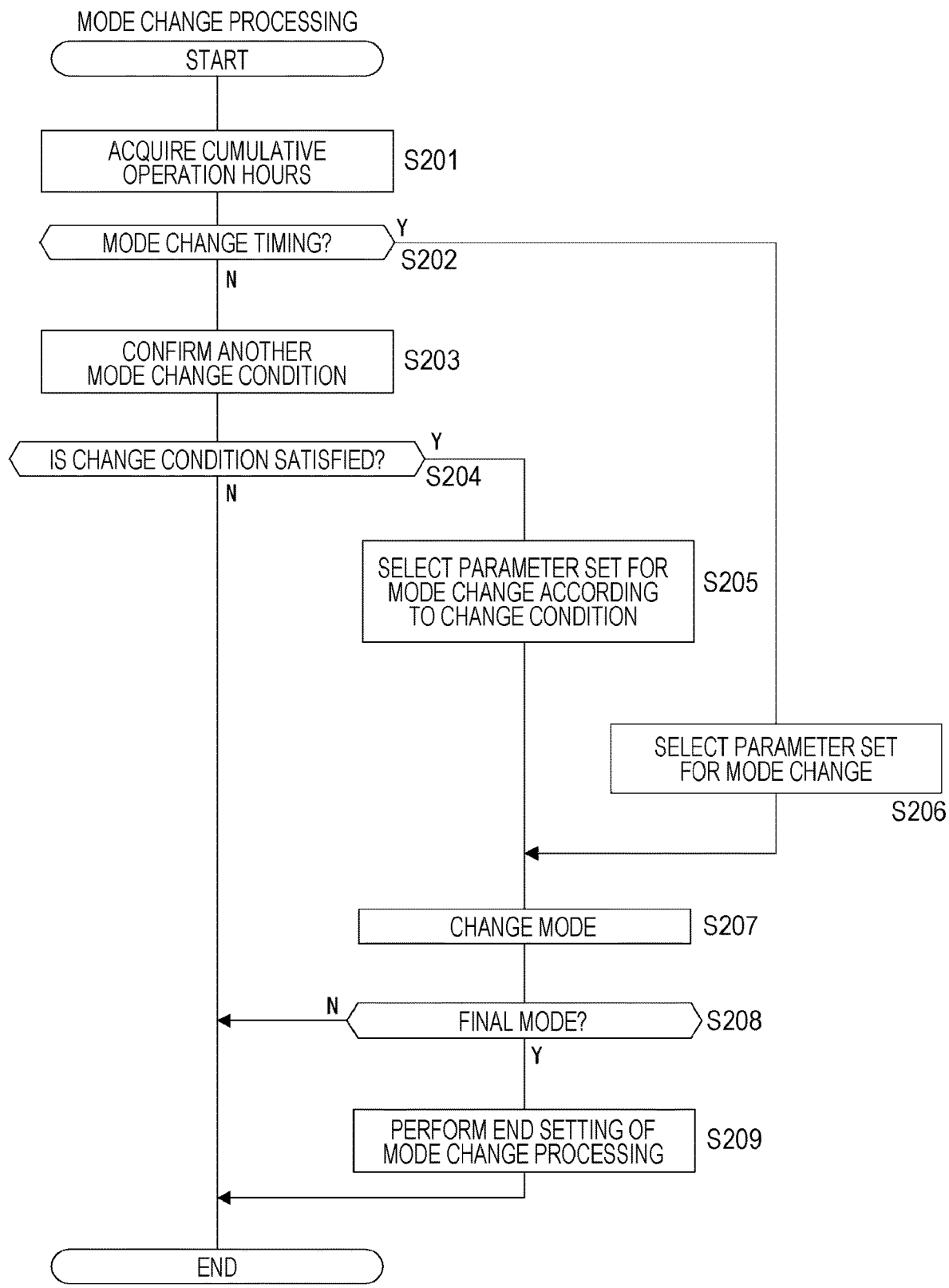
FIG. 11 is a flowchart of mode change processing according to the first embodiment.

The mode change processing in FIG. 11 is repeatedly executed, for example, regularly or irregularly. For example, the mode change processing may be executed every time the power is turned on, or may be executed every one hour during operation, for example.

In Step S201, the control unit 5 acquires cumulative operation hours.

For example, the control unit 5 causes an internal counter to count cumulative hours as a period during which the projector 1 is used (such as a period during which the power is on or time during which projection is being performed).

With this arrangement, the control unit 5 can determine how many hours the projector 1 has been used since the start of use.

In the example in FIG. 11, a time when cumulative operation hours have reached a certain time, or when a mode change condition is satisfied regardless of cumulative operation hours, is defined as mode change timing.

The control unit 5 determines in Step S202 whether or not the mode change timing is reached on the basis of the cumulative operation hours. For example, in a case where a change to the later period mode is performed after 10,000 hours has passed, in Step S202, cumulative operation hours and 10,000 hours as a comparison value is compared to determine whether or not the cumulative operation hours has reached 10,000 hours.

If the cumulative operation hours have reached the comparison value and the mode change timing is determined to have come, the control unit 5 selects a parameter set PSxx for a mode change in Step S206 ("xx" in PSxx is a value that identifies a parameter set).

Then, the control unit 5 performs the mode change in Step S207. In this case, in order to change from the early period mode to the later period mode, each of the parameters of the selected parameter set PSxx is instructed to each of the units. That is, as similar to the case of the early period mode, the control unit 5 sets a parameter related to luminescence drive current or parameter related to a phosphor wheel rotational rate to the light source drive unit 11, sets a parameter related to luminance adjustment or saturation adjustment to the signal processing unit 3, and sets a parameter related to a fan rotational rate to the fan drive unit 21.

In Step S208, the control unit 5 determines whether or not the changed mode is a final mode, and if the changed mode is the final mode, performs in Step S209 an end setting of the mode change processing in FIG. 11.

In the operation example illustrated in FIG. 7, the early period mode is switched to the later period mode and the later period mode is the final mode. Therefore, after changing the mode in Step S207 the mode is the final one.

The end setting of the mode change processing in Step S209 is a setting processing to stop further mode change processing in FIG. 11.

The mode change processing in FIG. 11 is performed regularly or irregularly in the early period in order to determine mode switching timing. However, after being switched to the later period mode as the final mode as in an example in FIG. 7, no mode change is performed and, therefore, the processing in FIG. 11 is unnecessary. Therefore, in Step S209, the setting to stop further execution of mode change processing is performed. With this arrangement, unnecessary processing is eliminated.

In a fourth embodiment to be described later, an example is illustrated in a case where the later period mode is divided into a plurality of stages (later-period first mode and later-period second mode). Note that, in that case, even if the mode is changed from the early period mode to the later-period first mode in the processing in FIG. 11, it is determined that the later-period first mode is not the final mode yet and, thus, the processing in FIG. 11 will continue. Details will be described later.

Here, in a case where the processing proceeds to Step S206 by determination based on cumulative operation hours, each of the following examples as (E1), (E2), (E3), and (E4) is conceivable to be a parameter set selection.

(E1) Prepare a parameter set PSxx for the later period mode for a case where the mode is changed according to a condition of cumulative operation hours, and select the parameter set PSxx.

In this case, the parameter set PSxx is suitable for long-term use of the projector 1 by, for example, setting a parameter set optimal for extending equipment lifetime, regardless of a parameter or using state of the early period mode.

(E2) Prepare a parameter set PS11 to PS20 for the later period mode corresponding to each of a parameter set PS1 to PS10 for the early period mode, and select a parameter set PS for the later period mode according to a parameter set PS the early period mode. For example, prepare combinations as in "PS1: PS11", "PS2: PS12" . . . "PS10: PS20". Then, for example, if the parameter set PS5 is used in the early period mode, the corresponding parameter set PS15 is selected in the later period mode.

In this case, in a case where the parameter set PS1 meets the demand "brightness is required, and low noise is required", the parameter set PS11 can be set to extend equipment lifetime while brightness and low noise are taken into consideration to some extent.

Therefore, it is possible to select a parameter setting intended to extend equipment lifetime while a use aspect (use location or period of use) of the early period is taken into consideration to some extent, and set the parameter for the later period mode.

(E3) Select a parameter set PS for the later period mode with reference to an operation log of the user in the early period. For example, the number/frequency of operation performed by the user to reduce brightness of a projected image, the number/frequency of operation to increase the brightness of the projected image, a tendency of image quality adjustment, or the like are referred to, and a parameter set PSxx among the parameter sets PS considered to be suitable for extending equipment lifetime, which is as close as possible to a tendency of the operation by the user, is selected.

In this case, it is possible to set the later period mode to extend equipment lifetime while including a factor to adapt to predicted operation by the user.

(E4) Select a parameter set PS for the later period mode with reference to a detection result of the sensor unit 20 detected in the early period. For example, a degree of deterioration of the equipment is estimated from a tendency of a decrease in brightness of the projected image, the number of error detection by a sensor, and the like. Then, among the parameter sets PS that are considered to be suitable for extending the equipment lifetime, a parameter set PSxx corresponding to the estimated degree of deterioration is selected.

In this case, it is possible to set the later period mode to extend equipment lifetime according to a predicted degree of deterioration.

Although described above is a case where cumulative operation hours reach a comparison value of 10,000 hours, for example, in Step S202, the processing proceeds from Steps S202 to S203 at a time point before the comparison value is reached.

In Step S203, the control unit 5 confirms another mode change condition.

The another mode change condition is a condition other than cumulative operation hours, and is a condition for determining that it is desirable to shift to an operating state that prioritizes equipment lifetime. For example, condition determination based on a detection signal by the sensor unit 20 is expected.

Specifically, for example, in a case where a tendency of a decrease in brightness is determined to be noticeable as a result of determination of brightness of the projected image obtained by an illuminance sensor or luminance sensor with respect to a drive current value by a current sensor, for example, it is conceivable that a condition is satisfied. This is a case where a tendency of deterioration in the light source unit 14 is in progress and it is a state where it is not desirable to continue adaptation of a demand from the user as the early period mode.

Furthermore, it is conceivable that there is a case where opening/closing frequency of the open/close sensor of the housing of the projector 1 is determined to be equal to or more than a predetermined value, or cumulative number of times of opening/closing is determined to be equal to or more than a predetermined value. For example, a status that allows for prediction of accelerated deterioration by the number of times or frequency of replacement of the filter of the fan 22 is estimated to be shift timing to the later period mode.

Furthermore, there may be a case where an error detection signal is obtained by various kinds of abnormality detection sensors. Progress of deterioration is estimated according to the number of times, frequency, content, or the like of an error state, by which shift timing to the later period mode is determined.

For example, the control unit 5 checks such mode change processing, and branches the processing depending on whether or not another mode change condition is satisfied in Step S204.

If the another mode change condition is not satisfied, the control unit 5 ends the processing in FIG. 11. That is, the early period mode is maintained.

If the another mode change condition is satisfied, the processing proceeds to Step S205, and a parameter set PSxx for mode change is selected according to the satisfied mode change condition.

Then, the control unit 5 performs the mode change in Step S207. Subsequent Steps S208 and S209 are as described above.

In this case, each of the following examples as (E1') or (E2), (E3), and (E4) described above is conceivable to be a parameter set PS selection in Step S205.

(E1') Prepare a parameter set PSxx for the later period mode for a case where the mode change is performed according to a predetermined change condition, and select the parameter set PSxx.

For example, apart from the above-described case of depending on cumulative operation hours, a parameter set PS corresponding to the satisfied mode change condition is prepared. For example, the parameter set PS corresponding to the satisfied mode change condition is a parameter set PS for when a condition based on the open/close sensor is satisfied, a parameter set PS for when a condition based on the luminance sensor is satisfied, or the like. Then, selection is made according to the satisfied change condition.

In this case, a setting more desirable for extending equipment lifetime can be performed by setting a parameter set suitable for an equipment status estimated from the satisfied change condition.

Selection methods in Step S206 and Step S205 may be common or different from each other. In a case where the selection methods are different from each other is conceivable, the following examples can be considered as combinations of the above-described (E1), (E1'), (E2), (E3), and (E4).

(E1) in Step S206 and (E1') in Step S205.
(E1) in Step S206 and (E2) in Step S205.
(E1) in Step S206 and (E3) in Step S205.
(E1) in Step S206 and (E4) in Step S205.
(E2) in Step S206 and (E1') in Step S205.
(E2) in Step S206 and (E3) in Step S205.
(E2) in Step S206 and (E4) in Step S205.
(E3) in Step S206 and (E1') in Step S205.
(E3) in Step S206 and (E2) in Step S205.
(E3) in Step S206 and (E4) in Step S205.
(E4) in Step S206 and (E1') in Step S205.
(E4) in Step S206 and (E2) in Step S205.
(E4) in Step S206 and (E3) in Step S205.

According to FIG. 11 above, in a case where either the cumulative operation hours reach a predetermined time or another mode change condition is satisfied, there is a mode change from the early period mode to the later period mode.

With this arrangement, the projector 1 shifts from an operating state applied to a use aspect of the user to an operating state that prioritizes equipment lifetime.

Note that, in the case of the example in FIG. 11, a change condition may be determined to be satisfied at an extremely early time point from start of use, although depending on the setting of the another mode change condition satisfied in Step S204. Therefore, it is conceivable that there is a case where processing in Steps S203 and S204 is not performed for a certain period of time (for example, up to 8000 hours).

Meanwhile, the processing in FIG. 11 has an advantage that progress of deterioration can be inhibited by switching to the later period mode corresponding to a case where deterioration actually progresses earlier than expected.

<3. Second Embodiment>

Figure 12:
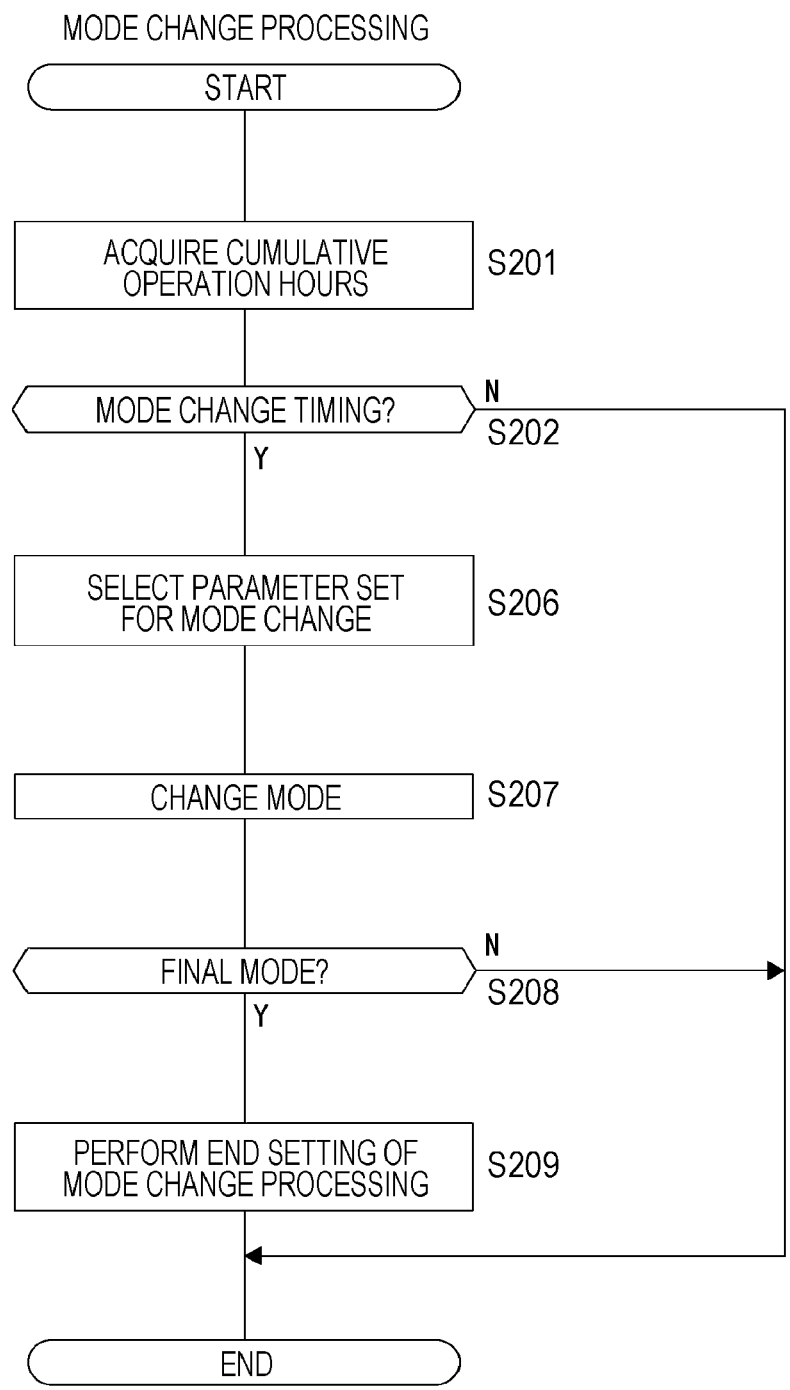
FIG. 12 is a flowchart of mode change processing according to a second embodiment.

FIG. 12 illustrates mode change processing according to the second embodiment. As similar to FIG. 11, the processing in FIG. 12 is processing that is repeatedly performed regularly or irregularly during a period of the early period mode.

Note that, it is assumed that the setting processing at start of use is as similar to the setting processing at start of use illustrated in FIG. 10.

This second embodiment is an example of shifting from the early period mode to a later period mode only on the basis of cumulative operation hours.

The control unit 5 acquires cumulative operation hours in Step S201 in FIG. 12, and then compares a comparison value (for example, 10,000 hours) with the cumulative operation hours to determine whether or not the mode change timing has come in Step S202. If the mode change timing has not come yet, the control unit 5 ends the processing in FIG. 12 and maintains the early period mode.

If the mode change timing has come (or the mode change timing has already passed), the control unit 5 selects a parameter set PS in Step S206, and performs a parameter setting for each of units to change the mode to the later period mode in Step S207.

Subsequent Steps S208 and S209 are as similar to the steps in FIG. 11.

Thus, the mode may be changed from the early period mode to the later period mode by determining the mode switching timing only on the basis of cumulative operation hours. In this case, there is an advantage that the mode change timing is fixed, for example, an advantage that current mode is clear at a time of maintenance.

<4. Third Embodiment>

Figure 13:
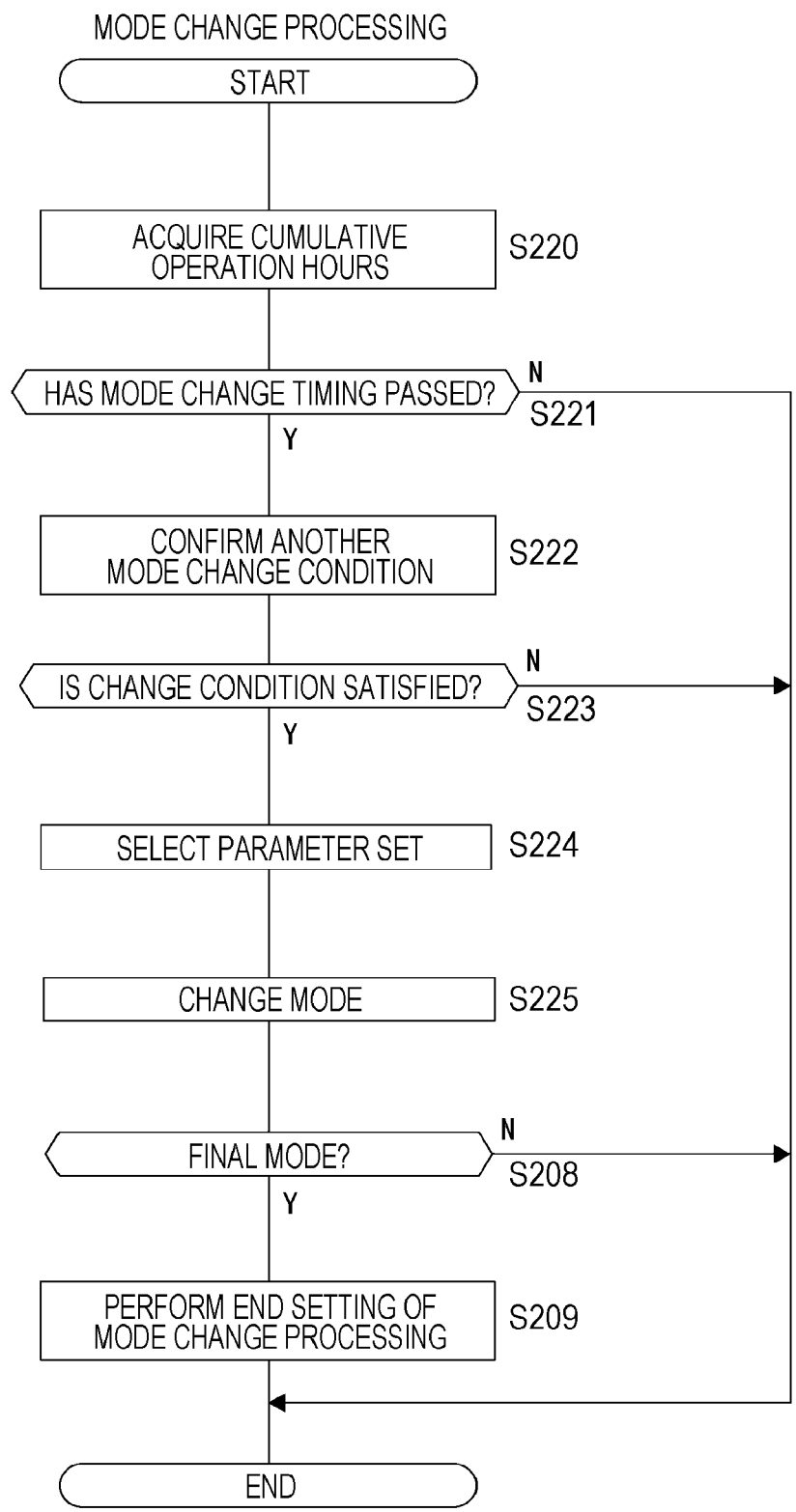
FIG. 13 is a flowchart of mode change processing according to a third embodiment.

FIG. 13 describes mode change processing according to the third embodiment. As similar to FIG. 11, the processing in FIG. 13 is processing that is repeatedly performed regularly or irregularly during a period of the early period mode.

It is assumed that the setting processing at start of use is as similar to the setting processing at start of use illustrated in FIG. 10.

In the third embodiment, as mode change processing, mode switching timing is determined by using an AND condition of cumulative operation hours and satisfaction of a mode change condition.

A control unit 5 acquires cumulative operation hours in Step S220 in FIG. 13, and then compares a comparison value (for example, 10,000 hours) with the cumulative operation hours to determine whether or not the cumulative operation hours have already passed a time set as a comparison value in Step S221.

If the cumulative operation hours have not yet reached the time as the comparison value, the control unit 5 ends the processing in FIG. 13 and maintains the early period mode.

In a case where the cumulative operation hours have already passed the time as the comparison value, the control unit 5 proceeds from Step S221 to S222; and although a meaning of another mode change condition is similar to a meaning in the first embodiment, it is conceivable that the another mode change condition may be one or may be more than one.

In Step S223, it is confirmed whether or not the another mode change condition is satisfied. Note that, in a case where there is a plurality of another mode change conditions, in Step S223, the mode change condition may be satisfied if at least one of the conditions is satisfied, or the mode change condition may be satisfied if all of the conditions are satisfied. Moreover, alternatively, it is conceivable that the mode change condition is satisfied when a predetermined number/predetermined ratio is satisfied.

In a case where it is not determined in Step S223 that the mode change condition is satisfied, the control unit 5 ends the processing in FIG. 13 and maintains the early period mode.

In a case where it is determined in Step S223 that the mode change condition is satisfied, the control unit 5 selects a parameter set PS in Step S224, and performs a parameter setting for each of the units to change to the later period mode in Step S225.

Subsequent Steps S208 and S209 are as similar to the steps in FIG. 11.

Thus, after the cumulative operation hours have reached a predetermined time, the another mode change condition is confirmed by using a detection signal from the sensor unit 20, and when it is determined that the mode change condition is satisfied, the mode shifts to the later period mode. In this case, the period of the early period mode that adapts to a use aspect specified by a user is maintained at least until the cumulative operation hours reach the comparison value, too-early shift to the later period mode does not occur.

<5. Fourth Embodiment>

Operation according to the fourth embodiment will be described with reference to FIGS. 14 and 15.

Figure 14:
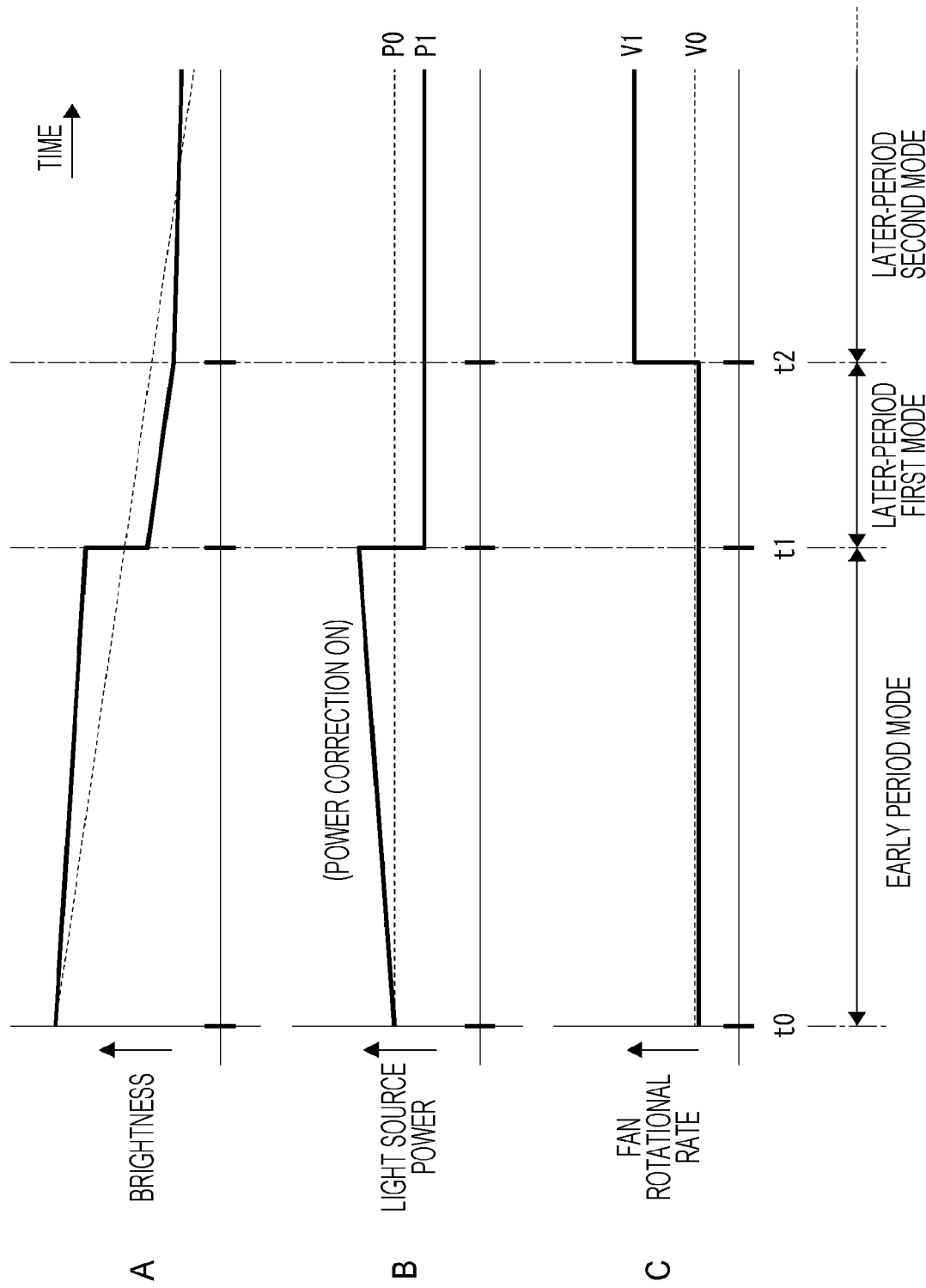
FIG. 14 is an explanatory diagram of a mode change operation according to a fourth embodiment.

As similar to FIG. 7, FIG. 14 illustrates brightness (FIG. 14A), light source power (FIG. 14B), and a fan rotational rate (FIG. 14C) of the projected image with horizontal axis representing time. As similar to FIG. 7, the broken line indicates a case where mode control is not performed.

In this example, a later-period first mode and a later-period second mode are divided as a later period mode.

In the early period up to the time point t1, as the early period mode, a parameter for laser power correction on/off is set to "on" and a fan rotational rate setting parameter is set to "V0". An example of this early period mode is a same as in FIG. 7, and, for example, the early period mode in this case is set for a case where it is determined from the use aspect information that a state of "bright and quiet" is desirable.

A period from a time point t1 to a time point t2 is the later-period first mode.

In the later-period first mode, the laser power correction on/off parameter is set to "off", and laser power (luminescence drive current value) is set to "P1", which is lower than a normal value "P0". The fan rotational rate setting parameter continues to be "V0".

According to such a later-period first mode, deterioration of a laser light source 131 is hindered by reducing luminescence drive current, allowing for a decrease in brightness of the projected image.

However, by keeping the fan rotational rate low, operation will continue with reduced noise.

The time point t2 or later is the later-period second mode.

In the later-period second mode, the fan rotational rate setting parameter is set to "V1", which is higher than a value with reduced noise "V0".

In this later-period second mode, by enhancing a cooling function, deterioration is further reduced, and equipment lifetime is further extended.

Thus, as the later period mode, it is conceivable to divide an operating state for a reduction in deterioration into a plurality of modes. By providing an intermediate mode (in this case, the later-period first mode) up to a final mode (in this case, the later-period second mode) to, for example, alleviate a degree of change in an operating state, it is possible not to give a user a feeling of uneasiness due to an extreme change in the operating state.

Of course, the case of the two later period modes is only an example, and the later period mode may be divided into three or more stages.

Furthermore, a same parameter may be changed in stages. For example, a luminescence drive current value is reduced in stages.

For example, in a case where the later period mode is divided into the later-period first mode and the later-period second mode as illustrated in FIG. 14, the parameter set PS is only required to be stored in, for example, the non-volatile storage unit 8 or ROM 7, corresponding to each as illustrated in FIG. 15.

For example, a parameter set PS1, PS2 . . . PS10 for the early period mode, a parameter set PS11, PS12 . . . PS20 for the later-period first mode, and a parameter set PS21, PS22 . . . PS30 for the later-period second mode are stored, and a parameter set PS is selected at each mode switching timing.

In a case where mode change processing as illustrated in FIG. 14 is performed, any one of processing in FIGS. 11, 12, and 13 can be applied as mode change processing of a control unit 5.

In that case, it is only required to perform determination in Step S202 (or S221) by using, as comparison values for determining the mode switching timing on the basis of cumulative operation hours, a first comparison value that is shift timing to the later-period first mode and a second comparison value that is shift timing to the later-period second mode.

As another mode change condition, it is only required that each of the mode change conditions is set.

Although a final mode is determined in Step S208 in FIGS. 11, 12, and 13, the equipment is not yet in the final mode at a time point where the mode is changed to the later-period first mode, and therefore, an end setting of mode change processing is not performed. Because the equipment is in the final mode at a time point where the mode is changed to the later-period second mode, the end setting of mode change processing is performed in Step S209.

<6. Conclusion and Modification>

According to the above embodiments, the following effects can be obtained.

A projector 1 (image display device) according to the embodiments includes a use aspect information acquisition unit 5a that acquires use aspect information regarding an equipment use aspect, an early period mode setting unit 5b that sets a parameter related to processing or operation executed at a time of image display on the basis of the acquired use aspect information and causes image display operation to be executed as an early period mode, a later period mode setting unit 5c that, in response to determination that it is the mode change timing, resets a parameter related to processing or operation executed at a time of image display and causes image display operation to be executed as a later period mode, and a timing determination unit 5d that determines the mode change timing.

With this configuration, a period during which an image display device as the projector 1, or the like, continues to be used (a period corresponding to equipment lifetime) is roughly divided into an early period and a later period. For example, in a case where the equipment lifetime is estimated to be 20,000 hours, a period of 10,000 hours from start of use is set as the early period, or the like, and a period after the 10,000 hours is set as the later period, or the like. Then, a mode (parameter setting) is switched from the early period to the later period. With this arrangement, it is possible to perform image projection operation in consideration of aging deterioration, or the like, in the early period and the later period, or image projection operation corresponding to a change in a circumstance expected due to passage of a use period.

Furthermore, by setting a parameter in the early period mode on the basis of use aspect information, image projection operation is executed in a state serving a purpose of introduction of the projector 1 by the user, by which operation suitable for a user who introduced the projector 1 is achieved.

In the first, second, third, and fourth embodiments, the later period mode setting unit performs a parameter setting for an operating state suitable for a purpose of extending equipment lifetime.

For example, deterioration of a light source element is reduced by reducing luminescence drive current, or deterioration of a part is reduced by strengthening operation of a cooling device.

In an early period of use of the projector 1, there may be a case where deterioration progresses rapidly, because an operating state is set to be suitable for the purpose of introduction by the user. Short equipment lifetime is not intention of the user. Furthermore, there is also a demand to use equipment for as long as possible beyond expected equipment lifetime. Therefore, by setting the later period mode to a parameter set PS that prioritizes equipment lifetime, deterioration can be reduced, and the equipment can be used for as long as possible.

Note that, although there is a case where the equipment lifetime prioritizing mode does not necessarily provide an optimal operating state in terms of an installation purpose at a time of introduction, after a certain long period of time has passed, demands from users often starts to place importance on operation without breakdown of equipment rather than an optimal operating state. Therefore, the projector 1 is subjected to mode control suitable for such a circumstance.

Furthermore, in a case where the mode shifts to the later period mode, the user can correspond by changing a purpose of use, usage environment, or the like. For example, it is only required to perform using in which image projection in an operating state in the equipment lifetime prioritizing mode has no problem. In that sense, the projector 1 of the present disclosure is preferable for a user who is a relatively large company, organization, or the like, who can introduce a plurality of projectors including new-model projectors to some extent, and who has various kinds of use locations, because each of the projectors 1 allows for rearrangement or the like over time and for use in a suitable state.

In the fourth embodiment, an example in which a parameter resetting is performed, as the later period mode, a plurality of times is described. For example, a multiple-time parameter resetting is conceivable, in which a later-period first mode is set at a time of entering a later period of the lifetime, and a later-period second mode is set according to subsequent development.

In the later period of use of the projector 1, there may be a case where it is appropriate to reduce deterioration while causing the equipment to be in more desirable operating state by changing it per a part of parameters. Therefore, for example, although a parameter setting that prioritizes equipment lifetime is set for the later-period first mode, a parameter setting further preferable to extend equipment lifetime, or the like is set for the later-period second mode, by which it is possible to obtain a use state as preferable as possible to the user.

In the first, second, third, and fourth embodiments, an example in which cumulative operation hours are used to determine mode change timing is described. For example, a state in which cumulative operation hours reach a predetermined time is set to be a whole condition, a requirement, or one of conditions for the mode change timing.

By using cumulative operation hours as one determination criterion for the early period and the later period, it is possible, to some extent, to appropriately divide into the early period and the later period from the previously estimated equipment lifetime. This also ensures temporal stability of ending a use aspect adaptive mode. That is, by using cumulative operation hours, it is possible to prevent a use aspect adaptive mode from being ended too early or the use aspect adaptive mode being continued indefinitely.

For example, in a case of the processing example in FIG. 11, although another mode change condition is also used, in such a case, it is conceivable to lengthen a comparison value with cumulative operation hours. For example, in a case where 20,000 hours is estimated as equipment lifetime, 12,000 hours, which is longer than half 10,000 hours, is used as a comparison value, and the mode change timing comes when the cumulative operation hours reaches 12,000 hours. Then, by that time, a timing suitable for a mode change is not missed by shifting to the later period mode by detecting an another mode change condition, while too-late shift time is prevented because the mode shifts to the later period mode at a timing of 12,000 hours mode at latest.

In a case of the example in FIG. 12, mode change timing is based only on cumulative operation hours, and therefore, it is possible to shift to the later period mode at timing that is previously expected to be appropriate (for example, 10,000 hours, or the like).

In a case of the example in FIG. 13, because the cumulative operation hours are used as one of AND conditions, too-early shift time can be prevented by setting a comparison value.

Note that, a comparison value in a case where timing determination is performed with cumulative operation hours (that is, setting of mode switching time) is only required to be determined according to expected lifetime of the projector, and should be set according to a type of a light source, or the like, for example. For example, in a case of a projector using a xenon lamp as a light source, mode change timing may be set to come after about cumulative operation hours of about 1,000 hours, or the like.

In the first and third embodiments, an example in which a value detected by the sensor unit 20 is used to determine mode change timing is described.

For example, by using a value detected by the sensor unit 20 as an illuminance sensor, an open/close sensor, a current sensor, an abnormality detection sensor, or the like, as one determination criterion of the early period and the later period, it is possible to perform determination according to an equipment status to shift from the early period to the later period. In particular, by using along with cumulative operation hours, it is possible to achieve mode switching that reflects a degree of deterioration of the projector 1, or the like, while ensuring that shift to the later period mode is not too early or not too late.

In the embodiment, an example (E4) of using a value detected by a sensor for selecting a parameter set PS in the later period mode is described. For example, the later period mode setting unit performs a parameter setting for the later period mode according to a value detected by an illuminance sensor, a current sensor, a housing open/close sensor, an abnormality detection sensor, or the like, the value being obtained during a period of the early period mode.

With this arrangement, a parameter for the later period mode can be set according to an operation status, a deteriorated part, or the like of the projector 1, and, for example, an operation mode suitable for long-term operation can be set.

In the embodiments, an example (E3) of using a user operation log data by a sensor for selecting a parameter set PS in the later period mode is described. For example, a parameter setting for the later period mode is performed with reference to history of parameter operation by the user.

With this arrangement, it is possible to operate in the later period mode with a parameter setting that reflects operation history of the user for the projector 1. For example, in a case where the user has frequently performed operation to reduce brightness of a projected image during operation up to that point, lowering brightness parameter easily meets a demand by the user and is also suitable for extending equipment lifetime. On contrary, in a case where the user frequently performs operation to increase the brightness of the projected image during the operation up to that point, reducing brightness moderately and extending equipment lifetime with another factor such as fan drive easily meet a demand by the user and achieve operation for a purpose of extending equipment lifetime.

In the embodiments, use aspect information includes information of equipment installation environment. For example, the use aspect information is information with which an installation environment such as a school, a meeting room, a museum, an art museum, or an amusement park, can be expected.

By including information of an equipment installation environment in use aspect information, it is possible to perform operation of the early period mode by performing a parameter setting suitable for the equipment installation environment.

In the embodiments, use aspect information includes information of a period of equipment use. Examples thereof include a daily period of use, or the like.

By including information of a period of equipment use in use aspect information, it is possible to perform operation of the early period mode by performing a parameter setting suitable for a degree of use. Furthermore, if the information is such that using state can be understood in more detail, it is possible to perform a parameter setting suitable for the status. For example, in a case of often using continuously for a long period of time, or the like, it is possible, even when performing projection at a high luminance, to perform a basic parameter setting as the early period mode in a state where a fine adjustment such as slightly reducing luminance or setting a higher rotational rate, is made.

In the embodiments, an example where the use aspect information acquisition unit 5a acquires use aspect information input according to user operation is described.

With use aspect information based on input by a user, it is possible to perform a parameter setting for the early period mode that suits a using state of the user.

Furthermore, in this case, the user does not need to be aware of performing parameter operation related to image projection operation. For example, the user only needs to input daily period of use, installation location, or the like, and can easily input even if not familiar with the equipment. Therefore, even if the user is not particularly aware of, with a parameter setting for the early period mode, image projection operation is performed corresponding to a using state intended by the user.

Note that, although a parameter set PS is selected and individual parameters included in the parameter set PS are set in the embodiments, an example in which values of individual parameters are selected for the early period mode and the later period mode is conceivable.

Furthermore, each of parameters of the early period mode and later period mode may not be stored but be obtained by calculation.

For example, an example is conceivable in which a drive current value in the later period mode is obtained by multiplying the drive current value for the early period mode by a coefficient, or the like.

Although the projector 1 is taken as an example in the embodiments, the present technology can be applied to another type of image display device such as a non-projection type image display device, that is, for example, a liquid crystal display device, and an organic EL display device, or the like.

Note that the effects described herein are only examples, and the effects of the present technology are not limited to these effects. Additional effects may also be obtained.

Note that the present technology can have the following configurations.

(1)

An image display device including a use aspect information acquisition unit that acquires use aspect information regarding an equipment use aspect, an early period mode setting unit that sets a parameter related to processing or operation executed at a time of image display on the basis of the use aspect information acquired by the use aspect information acquisition unit and causes image display operation to be executed as an early period mode, a later period mode setting unit that, in response to determination that it is the mode change timing, resets a parameter related to processing or operation executed at a time of image display and causes image display operation to be executed as a later period mode, and a timing determination unit that determines the mode change timing.

(2)

The image display device according to (1) described above, in which the later period mode setting unit performs a parameter setting to set an operating state in the later period mode suitable for a purpose of extending equipment lifetime.

(3)

The image display device according to (1) or (2) described above, in which the later period mode setting unit performs, as a later period mode, a parameter resetting a plurality of times.

(4)

The image display device according to any one of (1) to (3) described above, in which the timing determination unit uses cumulative operation hours for determination of the mode change timing.

(5)

The image display device according to any one of (1) to (4) described above, in which the timing determination unit uses a value detected by a sensor to determine the mode change timing.

(6)

The image display device according to any one of (1) to (5) described above, in which the later period mode setting unit uses a value detected by a sensor for parameter selection in the later period mode.

(7)

The image display device according to any one of (1) to (6) described above, in which the later period mode setting unit uses user operation log data for parameter selection in the later period mode.

(8)

The image display device according to any one of (1) to (7) described above, in which the use aspect information includes information of an equipment installation environment.

(9)

The image display device according to any one of (1) to (8) described above, in which the use aspect information includes information of a period of equipment use.

(10)

The image display device according to any one of (1) to (9) described above, in which the use aspect information acquisition unit acquires the use aspect information input according to user operation.

(11)

An image display method including acquiring use aspect information regarding an equipment use aspect, setting a parameter related to processing or operation executed at a time of image display on the basis of the acquired use aspect information and causing image display operation to be executed as an early period mode, determining mode change timing, and in response to determination that it is the mode change timing, resetting a parameter related to processing or operation executed at a time of image display and causing image display operation to be executed as a later period mode.

REFERENCE SIGNS LIST

1 Projector
2 Input signal interface
3 Signal processing unit
5 Control unit
5a Use aspect information acquisition unit
5b Early period mode setting unit
5c Later period mode setting unit
5d Timing determination unit
6 RAM
7 ROM
8 Non-volatile storage unit
10 Signal processing processor
11 Light source drive unit
12 Optical modulation drive unit
13 Lens drive unit
14 Light source unit
15 Optical unit
16 Optical modulation unit
17 Projection lens system
18 Operation unit
19 Display unit
20 Sensor unit
Fan drive unit
22, 22a, 22b, 22c, 22d Fan
23 Power supply unit
25 Substrate
50 Fluorescent optical unit
90 External device
91 Screen

The invention claimed is:

1. An image display device, comprising:
processing circuitry configured to
acquire use aspect information regarding an equipment use aspect;
set a parameter related to processing or operation executed at a time of image display based on the acquired use aspect information, and cause an image display operation to be executed in an early period mode;
determine a mode change; and
in response to determining the mode change, reset the parameter related to the processing or operation executed at the time of image display, and cause the image display operation to be executed in a later period mode,
wherein the processing circuitry is further configured to determine the mode change based on one of a first value detected by a first sensor and a second value detected by a second sensor, the second sensor being different from the first sensor, and
reset the parameter to a first parameter value when the mode change is determined based on the first value detected by the first sensor, and reset the parameter to a second parameter value different from the first parameter value when the mode change is determined based on the second value detected by the second sensor.

2. The image display device according to claim 1, wherein the processing circuitry is further configured to perform a parameter setting to set an operating state in the later period mode suitable for extending equipment lifetime.

3. The image display device according to claim 1, wherein the processing circuitry is further configured to perform, in the later period mode, resetting of the parameter a plurality of times.

4. The image display device according to claim 1, wherein the processing circuitry is further configured to use cumulative operation hours for determination of the mode change.

5. The image display device according to claim 1, wherein the processing circuitry is further configured to use user operation log data for parameter selection in the later period mode.

6. The image display device according to claim 1, wherein the use aspect information acquired by the processing circuitry includes information of an equipment installation environment.

7. The image display device according to claim 1, wherein the use aspect information acquired by the processing circuitry includes information of a period of equipment use.

8. The image display device according to claim 1, wherein the processing circuitry is further configured to acquire the use aspect information input according to a user operation.

9. An image display method, comprising:
acquiring use aspect information regarding an equipment use aspect;
setting a parameter related to processing or operation executed at a time of image display based on the acquired use aspect information, and causing an image display operation to be executed in an early period mode;
determining a mode change; and
in response to determining the mode change, resetting the parameter related to the processing or operation executed at the time of image display, and causing the image display operation to be executed in a later period mode,
wherein the determining step includes determining the mode change based on one of a first value detected by a first sensor and a second value detected by a second sensor, the second sensor being different from the first sensor, and
the resetting step includes resetting the parameter to a first parameter value when the mode change is determined based on the first value detected by the first sensor, and resetting the parameter to a second parameter value different from the first parameter value when the mode change is determined based on the second value detected by the second sensor.

10. The image display device of claim 1, wherein the first sensor is an open/close sensor and the second sensor is a luminance sensor, and
the processing circuitry is further configured to determine the mode change based on one of a frequency of or cumulative number of openings or closings detected by the first sensor.

* * * * *